(12) United States Patent
He et al.

(10) Patent No.: US 11,830,284 B2
(45) Date of Patent: Nov. 28, 2023

(54) PASSIVE THREE-DIMENSIONAL OBJECT AUTHENTICATION BASED ON IMAGE SIZING

(71) Applicant: SHENZHEN GOODIX TECHNOLOGY CO., LTD., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 279 days.

(21) Appl. No.: 17/352,375

(22) Filed: Jun. 21, 2021

(65) Prior Publication Data

US 2022/0414364 A1 Dec. 29, 2022

(51) Int. Cl.
*G06F 21/00* (2013.01)
*G06V 40/16* (2022.01)
*G06F 21/32* (2013.01)
*G06V 20/64* (2022.01)
*G06V 40/40* (2022.01)

(52) U.S. Cl.
CPC ........... *G06V 40/166* (2022.01); *G06F 21/32* (2013.01); *G06V 20/64* (2022.01); *G06V 40/165* (2022.01); *G06V 40/172* (2022.01); *G06V 40/40* (2022.01); *G06F 2221/2117* (2013.01)

(58) Field of Classification Search
CPC .... G06V 40/166; G06V 20/64; G06V 40/165; G06V 40/172; G06V 40/40; G06V 40/169; G06V 10/32; G06F 21/32; G06F 2221/2117
See application file for complete search history.

(56) References Cited

U.S. PATENT DOCUMENTS

| 2006/0120571 | A1* | 6/2006 | Tu ........................ G06V 40/171 382/118 |
| 2019/0311102 | A1* | 10/2019 | Tussy ....................... G06F 21/32 |
| 2022/0405381 | A1* | 12/2022 | Ortiz ..................... G06V 10/764 |

* cited by examiner

*Primary Examiner* — Jeffrey C Pwu
*Assistant Examiner* — William A Corum, Jr.
(74) *Attorney, Agent, or Firm* — KILPATRICK TOWNSEND & STOCKTON LLP

(57) ABSTRACT

Techniques are described for passive three-dimensional (3D) object authentication based on image sizing, such as for biometric facial recognition. For example, during a registration routine, an imaging system captures images of a registering user's face at multiple distances. The images can be processed to extract registration dimensions, including individual deterministic structural dimensions, dimensional relationships that are static over changes in imaging distance, and dimensional relationships that changes predictably over changes in imaging distance. During an authentication routine, the imaging system again captures authentication images of an authenticating user's face (purportedly the previously registered user) at some authentication imaging distance and processes the images to extract authentication dimensions. Expected and actual dimensional quantities are computed from the authentication and registration dimensions and are compared to determine whether the authenticating user's face appears to be authorized as previously registered and/or is a spoof.

18 Claims, 12 Drawing Sheets

PASSIVE THREE-DIMENSIONAL OBJECT AUTHENTICATION BASED ON IMAGE SIZING

FIELD

Embodiments relate generally to optics integrated into personal electronic devices. More particularly, embodiments relate to passive three-dimensional object authentication based on image sizing ratios, such as for biometric facial recognition and spoof detection.

BACKGROUND

Many modern electronic devices, such as smart phones, tablets, and laptops, are equipped with biometric security access systems, such as face identification (ID), fingerprint sensors, and the like. For example, face ID may be used to unlock a smart phone, log in to applications and accounts, to authorize mobile payments, etc. Similar face ID techniques are integrated into other access-control devices, such as electronic locks and automated teller machines (ATMs). Effective implementation designs tend to balance various considerations. For example, it is typically desirable to provide rapid and accurate results to a user in a manner that avoids both false positives (which reduce the security of the implementation) and false negatives (which can be frustrating to authorized users).

Conventional face ID systems tend to include relatively rapid, but relatively insecure facial recognition approaches based on identification of a limited number of large-scale structures. Such approaches tend to be relatively easy to spoof, for example, by using a two-dimensional image of an authorized user's face, a three-dimensional wax or latex model of an authorized user's face, or the like. For example, conventional face ID implementations on smart phones are typically designed to minimize usage of battery resources, memory resources, processor resources, etc. Also, conventional face ID implementations on smart phones tend not to be overly concerned with advanced spoofing techniques, or the like; and they tend to err on the side of allowing more false positives than false negatives to avoid frustrating authorized users who are trying to quickly unlock their smart phones. However, for many smart phone and other applications, it can be desirable to provide a higher level of security (including additional protection against spoofing), without excessively impacting battery, memory, processor, and other resources.

BRIEF SUMMARY OF THE INVENTION

Embodiments provide passive three-dimensional (3D) object authentication based on image sizing, such as for biometric facial recognition. For example, during a registration routine, an imaging system (e.g., in a smart phone or other electronic device) captures images of a registering user's face at multiple distances. The images can be processed to extract registration dimensions, including individual deterministic structural dimensions, dimensional relationships that are static over changes in imaging distance, and dimensional relationships that changes predictably over changes in imaging distance. During an authentication routine, the imaging system again captures authentication images of an authenticating user's face (purportedly the previously registered user) at some authentication imaging distance and processes the images to extract authentication dimensions. Expected and actual dimensional quantities are computed from the authentication and registration dimensions and are compared to determine whether the authenticating user's face appears to be authorized as previously registered and/or is a spoof.

According to one set of embodiments, a method is provided for authentication of an authentication object based on passive imaging. The method includes: capturing a set of images of the authentication object using an imaging system located an authentication imaging distance away from a first deterministic structure of a plurality of deterministic structures of the authentication object that are visible in the set of images; processing the set of images to measure at least a first authentication dimension of the first deterministic structure and a second authentication dimension of a second deterministic structure of the plurality of deterministic structures; obtaining registration dimensions from a registration database acquired by measuring at least the first deterministic structure and the second deterministic structure during a prior registration process; computing the authentication imaging distance based on a relationship between the first authentication dimension and the registration dimensions, and computing an expected imaging distance for the second deterministic structure based on a relationship between the authentication imaging distance and the registration dimensions; computing an authentication normalization factor as a ratio between the first and second authentication dimensions, and computing an expected normalization factor for the second deterministic structure at the expected imaging distance based on the registration dimensions and the authentication imaging distance; and authenticating the authentication object based on comparing the authentication normalization factor with the expected normalization factor. In some such embodiments, the method further includes outputting a user-perceivable authentication result to indicate whether the authenticating results in granting or denying authentication.

According to another set of embodiments, a system is provided for authentication of an authentication object based on passive face imaging. The system includes: a registration database having, stored thereon, a plurality of registration dimensions acquired by measuring a plurality of deterministic structures of an authentication object during a prior registration process; an imaging subsystem to capture a set of images of the authentication object while the authentication object is an authentication imaging distance away from a first deterministic structure of the plurality of deterministic structures; and a control and processing module having one or more processors and a memory having, stored thereon, a set of instructions which, when executed, cause the one or more processors to perform steps. The steps include: processing the set of images to measure at least a first authentication dimension of the first deterministic structure and a second authentication dimension of a second deterministic structure of the plurality of deterministic structures; computing the authentication imaging distance based on a relationship between the first authentication dimension and the registration dimensions; computing an expected imaging distance for the second deterministic structure based on a relationship between the authentication imaging distance and the registration dimensions; computing an authentication normalization factor as a ratio between the first and second authentication dimensions; computing an expected normalization factor for the second deterministic structure at the expected imaging distance based on the registration dimensions and the authentication imaging distance; and authenticating the authentication object based on comparing the authentication normalization factor with the expected normalization factor. In some such embodiments, the system further includes an output interface in communication with the control and processing module to outputting a user-perceivable authentication result responsive to and indicative of the control and processing module authenticating the authentication object.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Many modern electronic devices have integrated imaging systems that can be used for various features. For example, integrated imaging systems are ubiquitous in smartphones, automated teller machines, physical access control systems (e.g., electronic door locks), etc. In some cases, such imaging systems can provide user authentication features, such as for access control, biometric verification, and the like. Some imaging-based authentication features exploit face identification (face ID). For example, face identification can be used to provide depth and/or focusing information to the same and/or other imaging systems, to verify the authenticity or identification of a user, and/or for other purposes.

Figure 1:
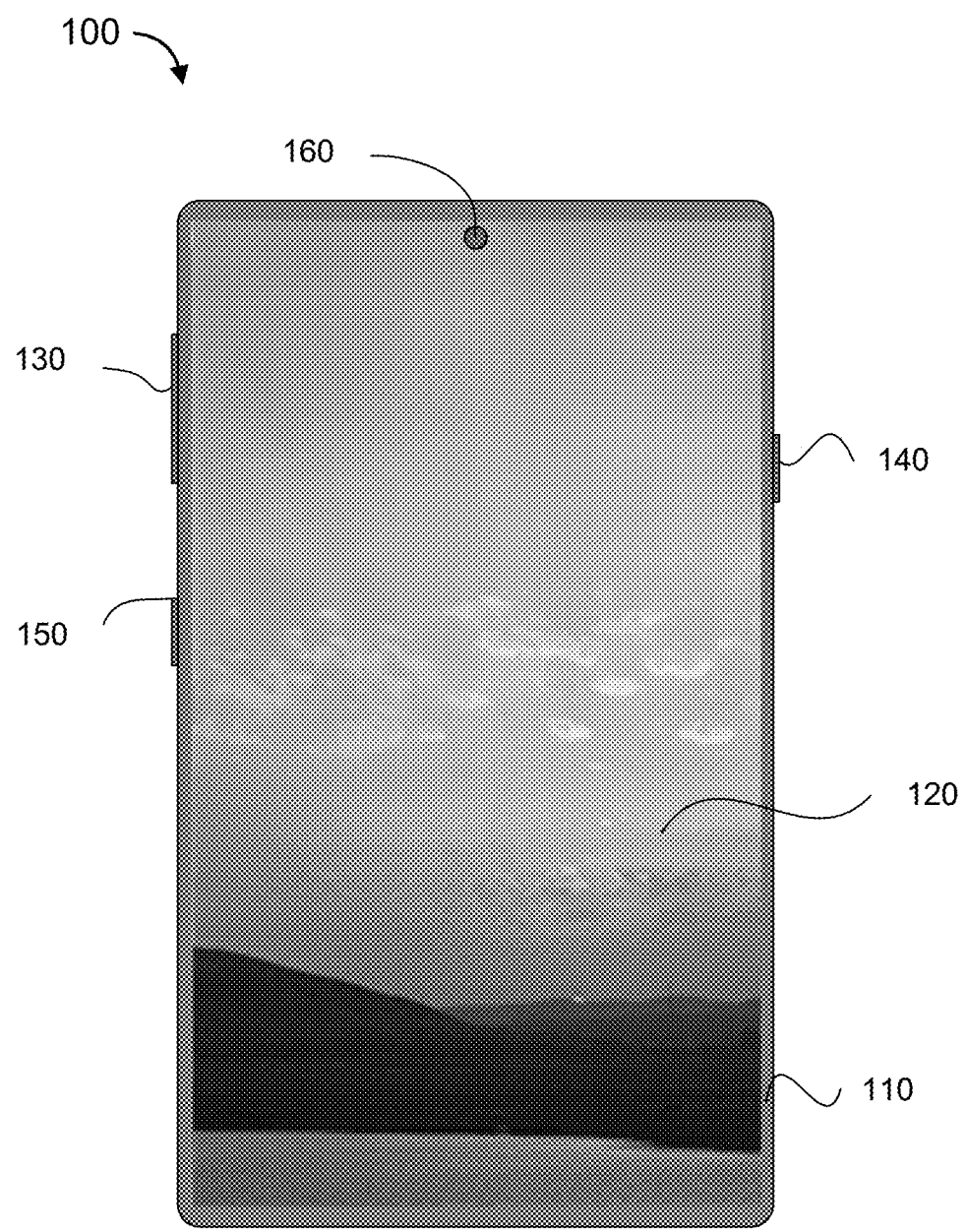
FIG. 1 illustrates a mobile device with an integrated imaging system.

For the sake of context, FIG. 1 illustrates a mobile device 100 with an integrated imaging system. The mobile device can be a smart phone, a tablet computer, a laptop computer, or the like, according to some embodiments. The mobile device 100 may include a display screen 120, a frame 110 surrounding the display screen 120, control buttons (e.g., a power button 140, audio volume control buttons 130, a holding force sensor 150, etc.), and/or any other components. The integrated imaging system can include one or more cameras 160, such as a front camera (e.g., a "selfie" camera), a rear camera, etc. In some implementations, the front camera 160 is also used for face ID sensing. In other implementations, a dedicated camera 160 is provided for face ID sensing.

Figure 2:
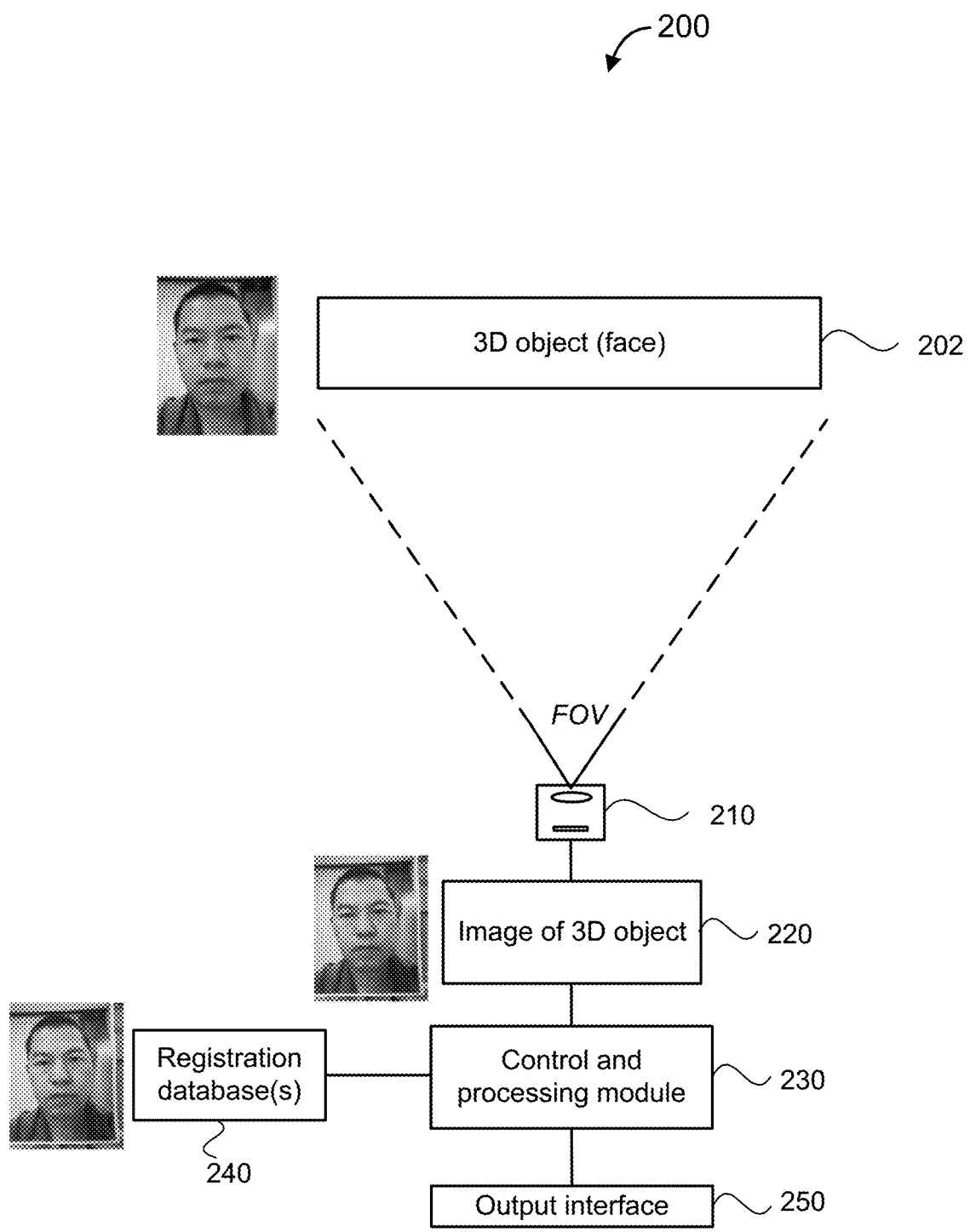
FIG. 2 illustrates a simplified block diagram of an electronic access control system that uses the registration and authentication techniques described herein to permit or deny access, according to some embodiments.

FIG. 2 illustrates a simplified block diagram of an electronic access control system 200 that uses the registration and authentication techniques described herein to permit or deny access, according to some embodiments. An imaging camera 210, such as the camera 160 of FIG. 1, can have an associated field of view (FOV) within which it can image a three-dimensional (3D) object 202. In the context described herein, it is generally assumed that the 3D object 202 is a human face, or is purported to be a human face. However, it will be appreciated that such descriptions should not be construed as limiting the invention to operate only in context of human faces and/or face ID sensing; rather, embodiments described herein can be applied to any suitable imaging context.

The camera 210 captures an image 220 of the 3D object 202 using imaging optics (e.g., lenses, mirrors, filters, etc.), sensors (e.g., photodetectors), and/or any suitable components. In some embodiments, capturing of the image 220 can involve focusing the imaging optics and/or tuning the sensors to form a clear image with desired sharpness, contrast, chromatic characteristics, etc. For example, the captured image 220 can have no or very small distortions or other types of image aberrations (e.g., spherical aberration, coma, astigmatism, and field curvature).

A control and processing module 230 may analyze the characteristics of the image 220. For example, the control and processing module 230 may be configured to identify that the image 220 contains an image of a human face, and can extract facial signatures of the human face from the image 220. The control and processing module 230 may be further configured to compare the facial signatures in the image 220 with facial signatures of an authorized user stored in a registration database 240 (e.g., one or more registration databases). The registration database 240 may include face ID data of the authorized user generated during a registration process. For example, during the registration process, one or more images of the live face of the authorized user may be captured by the camera 210. The images may be analyzed to extract (e.g., and characterize, etc.) the facial signatures of the authorized user. The facial images of the authorized user, as well as the facial signatures, may be stored in the registration database 240 for subsequent security check.

The control and processing module 230 may determine whether the facial signatures in the ideal image 220 matches with a face ID data stored in the registration database 240. The control and processing module 230 may output a facial recognition decision via an output interface 250. The electronic access control system 200 can grant or deny access based on the decision provided via the output interface 250. For example, the electronic access control system 200 can be used to authorize physical access (e.g., as part of a biometric door lock, a biometric lock for a vault or file cabinet, etc.), logical access (e.g., to provide access to a mobile device, a computational system, automated teller machine account access, etc.), and/or any other types of access control. For example, a processing unit of the mobile device 100 may grant or deny access, and/or provide other features, based on the facial recognition decision. For example, if the control and processing module 230 outputs a positive facial recognition decision indicating a match, the processing unit of the mobile device 100 of FIG. 1 may grant access to the mobile device 100 (e.g., waking up the mobile device 100), authorize a payment transaction using the mobile device, etc. On the other hand, if the control and processing module 230 outputs a negative facial recognition decision indicating a non-match, the processing unit of the mobile device 100 may deny access to the mobile device 100 (e.g., the mobile device 100 may remain locked).

In many practical contexts, such face ID sensing is designed to balance potentially competing considerations. For example, conventional approaches tend to analyze the captured image 220 only to a level at which to a relatively small number of characteristic points or measurements can be extracted from large-scale facial structures (e.g., corners of eyes). Those extracted points or measurements are then compared against previously registered points or measurements to determine whether a statistical match is apparent. Such an approach can be relatively fast and light-weight (e.g., using minimal computational, memory, battery, and/or other resources), but may also provide a relatively low level of security. For example, such an approach may yield a false-positive match for similar looking individuals and/or may be relatively simple to spoof using a high-resolution two-dimensional image of an authorized user's face, a three-dimensional wax or latex model of an authorized user's face, or the like. For many smartphone and other applications, it can be desirable to provide a higher level of security (including additional protection against spoofing), without excessively impacting battery, memory, processor, and other resources.

Figure 3:
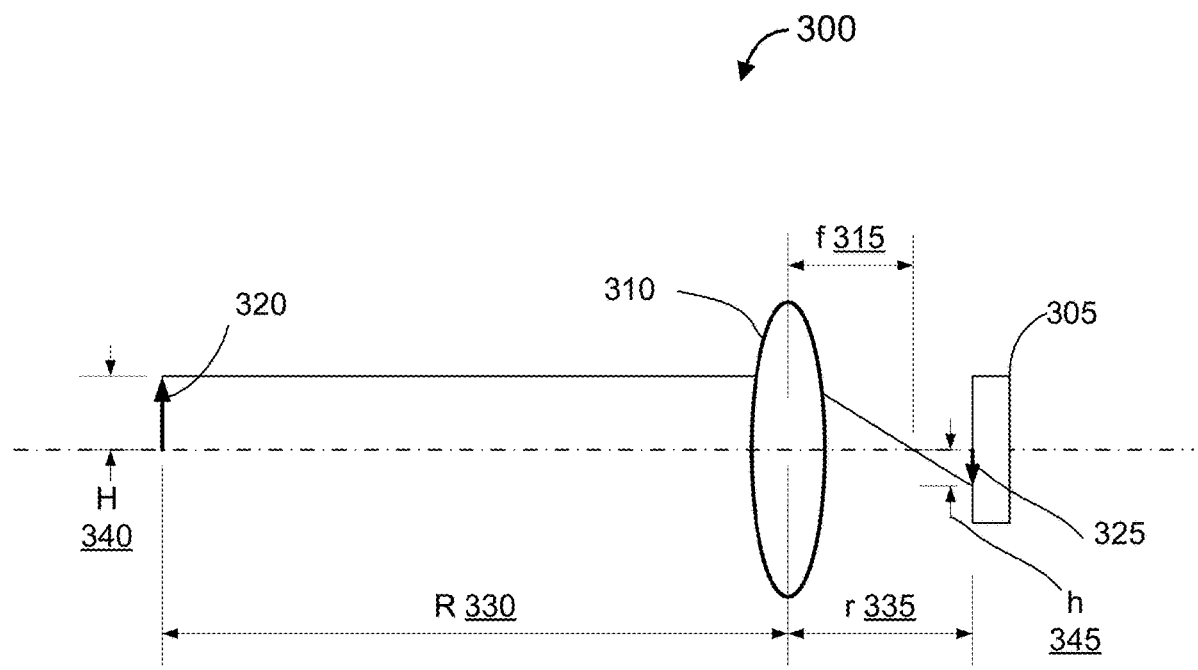
FIG. 3 shows an imaging environment to illustrate the optical principles involves in using image size to derive depth information from imaging, as a context for embodiments herein.

In general, embodiments described herein exploit various optical principles, including image size, to derive depth information from imaging. FIG. 3 shows an imaging environment 300 to illustrate the optical principles involves in using image size to derive depth information from imaging, as a context for embodiments herein. As illustrated, a lens 310 forms an image 325 of an object 320 on a photodetector 305 (e.g., a photodiode array). The lens 310 has a known focal length (f) 315, the photodetector 305 is a known imaging distance (r) 335 from the lens 310, and the object 320 has a known object dimension (H) 340. When the object 320 is a particular object distance (R) 330 from the lens 310, the image 325 will manifest a dimension (h) 345 corresponding to H 340.

In such a configuration, R 330 is a function of h 345 in context of the known values of f 315 and H 340 (e.g., and also r 335, in some cases). For example, R 330 can be determined by measuring h 345 (e.g., measuring a number of pixels across the dimension h 345) according to the computation: R~f*H/h. As described herein, where the object 320 includes multiple structures, multiple such measurements and computations can be used to obtain multiple distance measurements. In some embodiments, a particular dimension of a particular structure can be used as a dimensioning feature. A relatively high-contrast feature with relatively unchanging dimension is selected to be considered as a unit dimension length, or the like; and other features can be dimensioned relative to that unit dimension length (referred to herein as "feature-relative dimensioning"). For example, the width of a user's left eye is used as a unit dimension length (i.e., the user's left eye is 1.000 left-eye-widths across), and other facial dimensions for the user are dimensioned relative to the same unit (e.g., the same user's mouth is measured as 1.328 left-eye-widths across). In other embodiments, rulers and/or other calibrations methodologies are used to establish dimensions based on non-relative dimensional units, such as millimeters, number of pixels, etc. (referred to herein as "absolute dimensioning").

Figure 4:
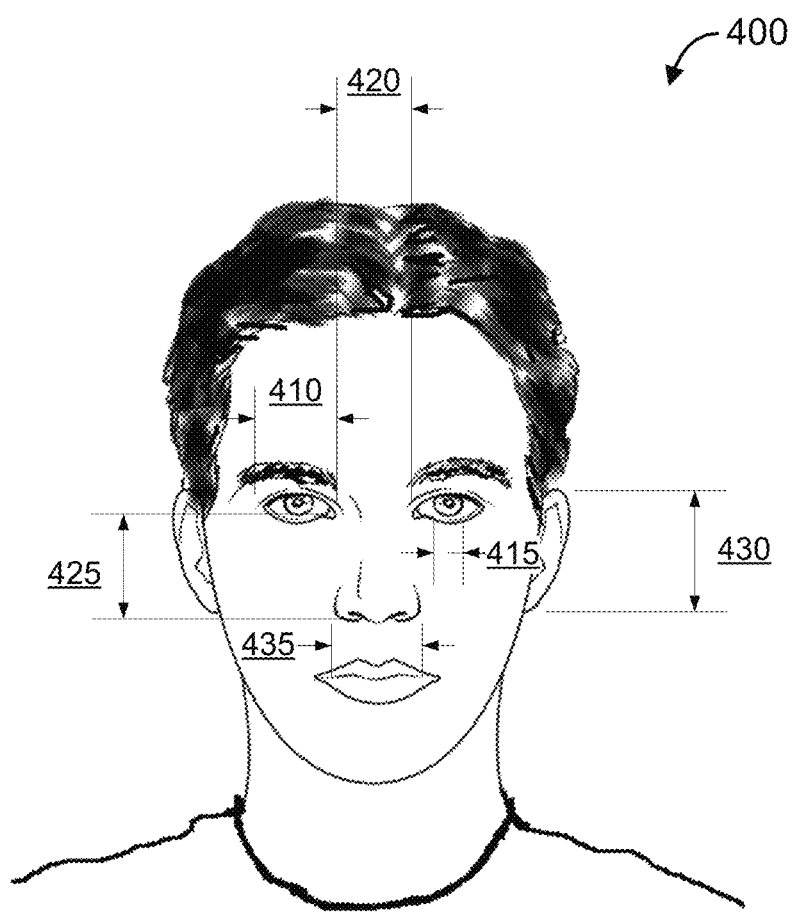
FIG. 4 shows an illustrative image of a face with various deterministic macro-structures.

In context of face ID sensing, a number of deterministic macro-structures (i.e., large scale structures) have been shown to provide measurements that are relatively characteristic of a particular individual and tend to remain consistent over time for that particular individual. FIG. 4 shows an illustrative image 400 of a face with various deterministic macro-structures. As illustrated, the deterministic macro-structures often correspond to sensing organs of the face, such as eyes, nose, and ears. For example, the illustrated image 400 indicates measurements of eye width 410 (e.g., between the outer corners of an eye), distance between eyes 420 (e.g., between the inner corners of the two eyes), iris diameter 415, distance from eye corner to bottom of nose 425, height of ears 430, width of nose 435, etc. Additional deterministic macro-structures can be used in some implementations, such as sizes of front teeth, nose length, etc.

Some macro-structures can be excluded from use in face ID sensing contexts when determined to be insufficiently deterministic. For example, the mouth may appreciably change shape with changes in emotion and facial expression, such that the mouth may not provide sufficiently deterministic macro-structure measurements. Similarly, eyebrows, forehead wrinkles, hairline, pupil diameter, and other large-scale structures of a face image may change from one imaging session to another. Further, some deterministic macro-structures tend to be selected or excluded in face ID sensing contexts based on how easily or reliably they can be measured. For example, conventional face ID sensing techniques may not be able to reliably locate the tip of a nose because there may not be an easily identifiable feature in that location, or conventional face ID sensing techniques may not be able to reliably locate the tip of an earlobe because the earlobe may not reliably be in view of the imaging system.

Different implementations and implementation contexts can yield different approaches to obtaining deterministic macro-structure measurements. As a user turns or tilts her head relative to the imaging system, and/or changes her distance from the imaging system, certain measurements can change. Still, such effects on the measurements tend to be substantially deterministic. For example, when a head is turned, each eye is at a different distance from the imaging system and has a different 3D orientation with respect to the imaging system; but those eye-to-eye differences tend to follow predictable mathematical patterns. As such, rather than relying solely on the deterministic macro-structure measurements directly obtained from the image, embodiments can employ additional computations, normalizations, statistical processes, and/or other processes to account for these and other types of effects on those measurements. For example, in some implementations, deterministic macro-structure measurements include computationally derived measurements. For example, an implementation can measure the distance between the eyes 420 and the distance from an eye corner to the bottom of the nose 425, and can further compute a ratio of measurements 420 and 425 as a computationally derived measurement. In some embodiments, such computationally derived measurements are used as part of the set of deterministic macro-structure measurements. In other embodiments, such computationally derived measurements are used to correct the set of deterministic macro-structure measurements. For example, expected deterministic macro-structure measurements can be considered as lying in an expected measurement plane, and any changes to the orientation or location of the user's head effectively changes the orientation and location of the measurement plane to that of an imaged measurement plane (and correspondingly changes the positions and orientations of the obtained deterministic macro-structure measurements). The computationally derived measurements can be used to mathematically characterize the orientation and/or position of the imaged measurement plane, and to determine and apply a corresponding mathematical transform to reposition and reorient the obtained deterministic macro-structure measurements into the expected measurement plane.

Figure 5:
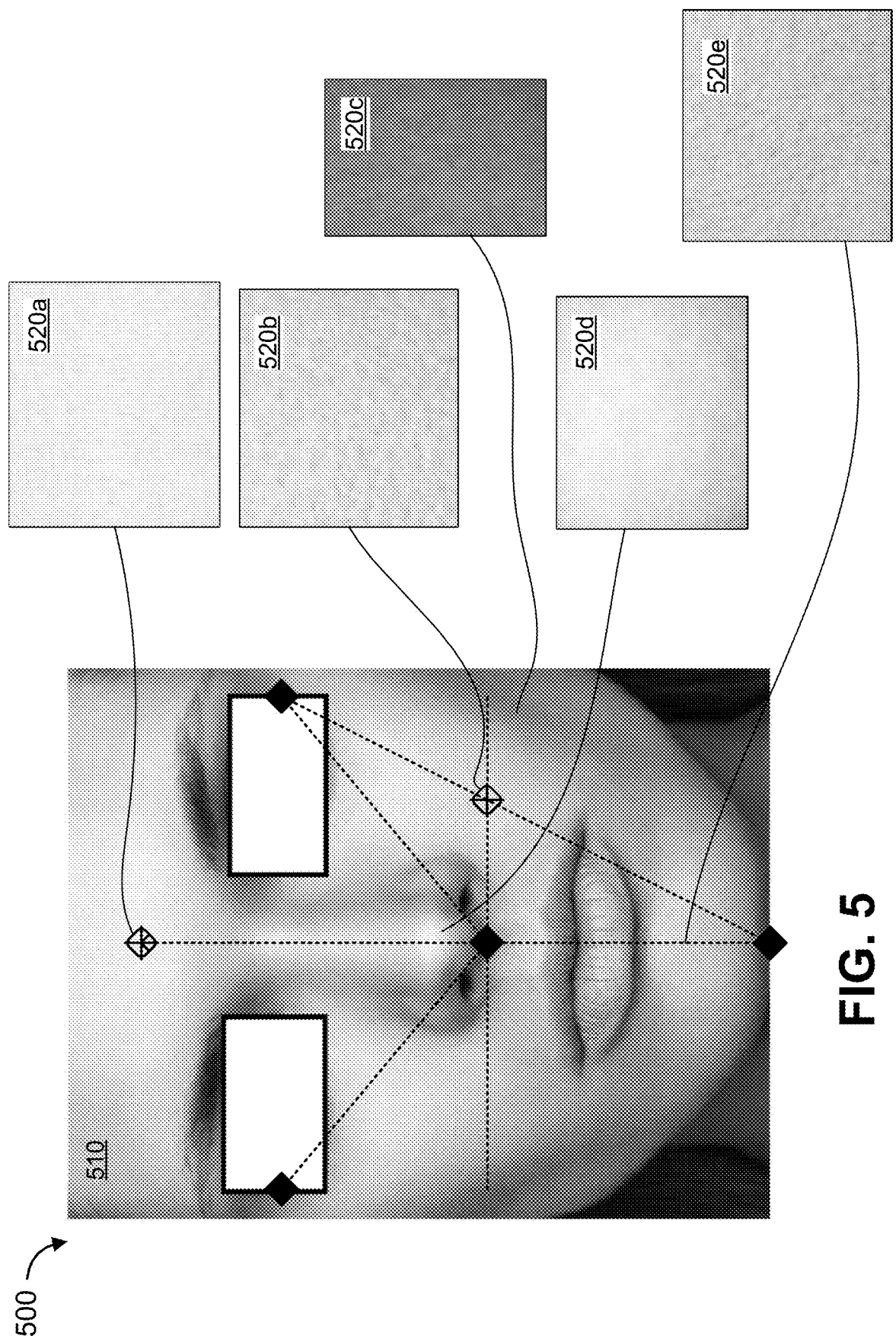
FIG. 5 shows an illustrative set of imaging data as a context for various embodiments described herein.

FIG. 5 shows an illustrative set of imaging data 500 as a context for various embodiments described herein. The illustrative set of imaging data 500 includes a high-definition image 510 of a portion of a human face, and multiple characteristic sub-images 520, each associated with a respective deterministic micro-structure feature region. The illustrative set of imaging data 500 is intended only to illustrate features of embodiments, and is not intended to limit the types of images described herein. For example, though the illustrative set of imaging data 500 includes processed output images from imaging systems, some embodiments described herein rely on imaging data that includes raw output data from image sensors (e.g., that has not been color-corrected, or otherwise processed).

The "object" (i.e., the imaged portion of the human face) shown in image 510 includes a number of different types of traceable structures. As described herein, embodiments can use these traceable structures to reliably locate deterministic micro-structure feature regions. In some embodiments, the traceable structures are the deterministic macro-structures, such as described in FIG. 4. For example, the traceable structures include eyes, ears, and nose. Such deterministic macro-structures can yield deterministically measurable feature locations, such as eye corners, eye width, nose width, etc. In some embodiments, the traceable structures can include additional macro-structures that are not necessarily deterministic, but may still be reliable locators for deterministic micro-structure feature regions. For example, the traceable structures in such embodiments can include eyebrows, eyelashes, eyelids, nostrils, lips, etc.

The deterministic micro-structures can be small-scale structures of the imaged object that are sufficiently consistent from one imaging session to another to be useful for face identification. Such deterministic micro-structures tend not to be easily seen or characterized without additional image processing. In some embodiments, such deterministic micro-structures are skin texture features, such as pore patterns. Notably, the deterministic micro-structures do not include non-deterministic features. For example, freckle patterns may tend to change over time with a person's recent sun exposure, or the like. In some implementations, the deterministic micro-structures can include other types of small-scale deterministic structures, such as iris vein patterns, or the like. However, some such micro-structures, even though deterministic, may still be prone to spoofing. For example, a high-resolution photograph may sufficiently capture vein patterns in a person's eyes to spoof an imaging system (e.g., as opposed to skin textures, which may not be captured by even the highest-resolution photographs). As such, some embodiments avoid using those types of deterministic micro-structures for face ID sensing, or only use those types of deterministic micro-structures along with other types of deterministic micro-structures that are less prone to spoofing.

The deterministic macro-structures can be used to locate deterministic micro-structure feature regions in any suitable manner. For example, as illustrated, the deterministic macro-structure measurements can be used to generate various grids, distances, angles, etc., from which to guide location of one or more deterministic micro-structure feature regions. As one example, a first deterministic micro-structure feature region is known to be located (e.g., based on prior registration) some vertical distance from the bottom of the nose. Upon imaging of the face, a vertical reference is computed as running from a center between the eyes to a center of the chin; and the first deterministic micro-structure feature regions can be found at the corresponding distance along that vertical reference from the bottom of the nose. As such, a first characteristic sub-image 520*a* can be derived to correspond to the first deterministic micro-structure feature region. As another example, a second deterministic micro-structure feature region is known to be located at a point on the cheek that corresponding to a particular intersection of reference lines and triangles. In particular, upon imaging the face, a triangle is located with vertices at the bottom center-point of the nose, the outer-right eye corner, and the center point of the chin; a horizontal reference line is located to pass through the of the bottom center-point of the nose and to run perpendicular to the vertical reference; and the location of the second deterministic micro-structure feature region is derived from the intersection of the horizontal reference with the hypotenuse of the triangle. As such, a second characteristic sub-image 520*b* can be derived to correspond to the second deterministic micro-structure feature region.

Figure 6:
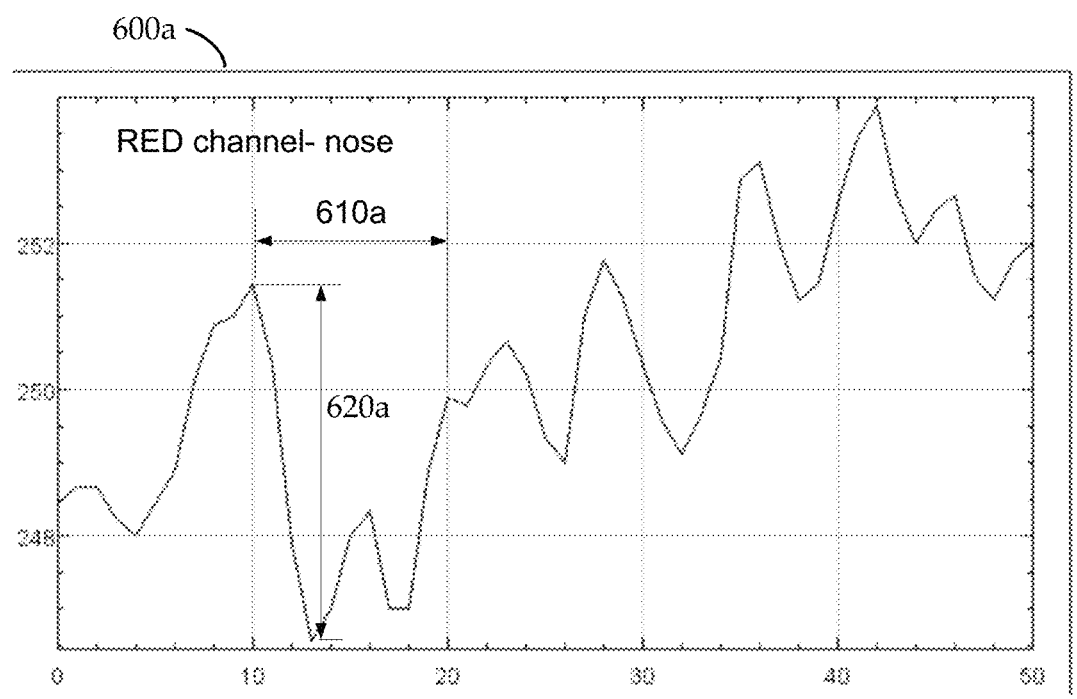
FIG. 6 shows illustrative partial chromatic responses for illustrative portions of two characteristic sub-images.
Figure 6:
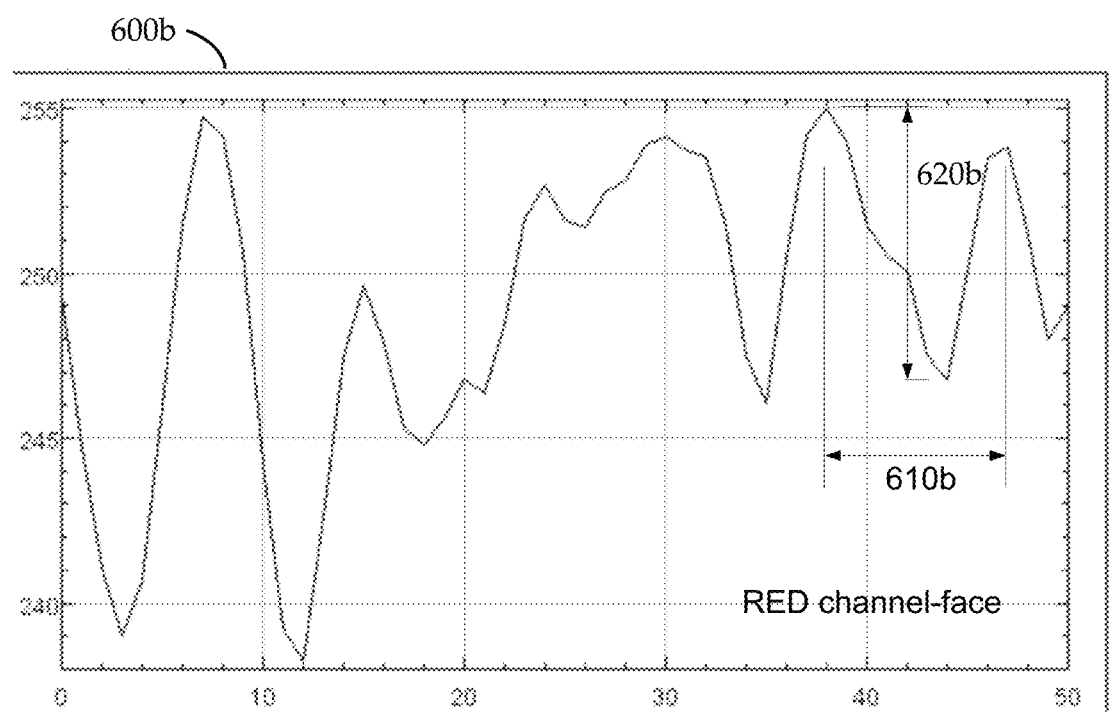

Having located the deterministic micro-structure feature regions, the corresponding characteristic sub-images 520 at those locations can be processed to derive deterministic micro-structure measurements. FIG. 6 shows illustrative partial chromatic responses 600 for illustrative portions of two characteristic sub-images. In particular, a first chromatic response 600*a* is derived from a portion of characteristic sub-image 520*d* of FIG. 5, which corresponds to a feature region around the tip of the nose; and a second chromatic response 600*b* is derived from a portion of characteristic sub-image 520*b* of FIG. 5, which corresponds to a feature region around the cheek. Each illustrated chromatic response 600 is an image brightness plot, shown as a plot of brightness value of the chromatic component (e.g., signal level of corresponding photodetector elements) versus location, over a fifty-pixel-long row of an image sensor array. For example, the imaging system is focused using a medium-wavelength chromatic component, such as using "green" chromatic responses, and the plotted value indicates the magnitude of response of a red photodiode component of each pixel of a photodiode array of the imaging system. Some embodiments described can operate regardless of which color component(s) are used for focusing, color correction, imaging, chromatic response plots, etc. For example, certain chromatic configuration options can tend to increase response magnitudes, improve contrast, and/or otherwise improve certain sensing parameters; but some embodiments may still operate reliably across a large range of such chromatic configuration options.

Multiple types of information can be obtained from the chromatic responses 600. To obtain such information, implementations can compute statistics to measure the distribution of brightness slopes, standard deviations of brightness valley depths, profile valley widths, and/or other values. For example, an illustrative brightness valley depths 620 and an illustrative profile valley width 610 are shown in each plot 600. Valley depth information can be denoted by the image contrast, and average valley width at an average valley depth can be computed to form a face structure map. Such plots and values can be generated and analyzed (i.e., computations performed) across some or all portions of the image. For example, some implementations compute such values across an entire face image, and other implementations only compute such values within predefined and located deterministic micro-structure feature regions. As described above, the various plots and values can be mapped to face locations in accordance with the deterministic macro-structure measurements and locations. In some embodiments, the derived deterministic micro-structure measurements are mapped to deterministic macro-structure locations to establish a 3D map of an entire face or portions of a face.

It can be seen that the chromatic response plots 600 can be used to obtain (e.g., extract, derive, compute, etc.) textural signatures. The pattern of peaks and valleys in the chromatic responses 600 can be indicative of deterministic micro-structures, for example, corresponding to the pores and/or other textural variations of the skin in the respective portions of the respective characteristic sub-images 520. Obtaining and characterizing such a textural signature can support certain features. One such feature is that sensing the presence of such a textural signature clearly indicates that the images object is a 3D object with a pattern of micro-structures. For example, a high-resolution 2D photograph may match deterministic macro-structures of a pre-registered individual. However, such a photograph will not include such micro-structures, and imaging of the photograph will not produce such textural signatures. Notably, such a feature does not rely on pre-registration or matching of any particular textural signature; only that a textural signature is present. For example, an implementation can use deterministic macro-structures for face ID sensing, and can further detect presence of any textural signature to ensure that the imaged object is not a 2D photograph, or a 3D model without texture.

Another use of such textural signatures is to determine whether an obtained textural signature is characteristic of the object being imaged. For example, patterns and/or ranges of measurements of valley depths 620 and valley widths 610 obtained from human face skin images may tend to be relatively consistent across most or all human faces. As such, some embodiments can determine whether a derived textural signature is characteristic of a human face, even without pre-registration or matching of any particular textural signature. Some such embodiments can, for example, use deterministic macro-structures for face ID sensing, and can further detect presence of a characteristic textural signature to indicate that the imaged object is a real human face (i.e., not a 2D photograph, 3D model, or other spoof).

Another use of such textural signatures is to determine whether an obtained textural signature is characteristic of a particular, pre-registered user. For example, particular patterns or measurements of valley depths 620 and valley widths 610 obtained from characteristic sub-images 520 of a user's face are correspond to deterministic micro-structures that are practically unique to the user (e.g., sufficiently unique for use in facial recognition, user authentication, biometric verification, etc.). As such, some embodiments can determine whether a derived textural signature matches a profile (i.e., pre-registered) set of textural signatures for a user who is purportedly being imaged. In such embodiments, face ID sensing can use both deterministic macro-structures and deterministic micro-structures to support both verification of a user's identify and spoof detection.

While the illustrated plots only show a chromatic response plots for a single chromatic component (i.e., red), chromatic information can yield additional information that can support additional features. In some embodiments, a single narrow-band optical wavelength is used for face ID sensing. For example, a particular wavelength is chosen to yield sharp contrast in the chromatic response across a wide range of skin tones, pigments, and other characteristics. Some embodiments can use light within the visible spectrum. Other embodiments can additionally or alternatively use light outside of the visible spectrum, such as in an infrared (e.g., near-infrared), or other spectrum. In some embodiments, relative and/or absolute depth information can be obtained by comparing chromatic response data across multiple chromatic responses. For example, the imaging system can be focused according to a green chromatic component, and chromatic response plots can be generated for red and blue chromatic components derived from imaging of an object at some distance from the imaging system. Because the lens will tend to have different focal lengths for different chromatic components at different object distances, differences in sharpness indicated by the different chromatic component responses for a particular characteristic sub-image 520 can be indicative of the relative (e.g., or absolute, if calibrated) distance of the deterministic micro-structure feature region corresponding to that characteristic sub-image 520. This depth information can be used for various purposes, such as to help determine the orientation and/or position of the face being images, to help find one or more absolute reference distances, etc.

Some embodiments can be implemented with only relative distance measurements. As described above, some such embodiments can rely on computationally derived measurements, or the like. For example, upon imaging the face, 2D or 3D coordinate locations are recorded for the bottom center-point of the nose (A), the outer-right eye corner (B), and the center point of the chin (C). In such a case, all these coordinate locations may be referenced to some generated image reference coordinate system and may not have any relation to absolute measurements. Still, a reference vertical can be generated according to line AC, a reference horizontal can be generated to intersect perpendicularly with the reference vertical at point A, a reference triangle can be generated as triangle ABC, etc. Without any absolute distance measurements, the location of a deterministic micro-structure feature region can be obtained according to the reference features. As one example, the pre-registered location of a deterministic micro-structure feature region can be defined as the end of a vector that originates at point A in a direction that bisects line BC at some location (D) and extends 1.4-times the distance of AD.

Figure 7:
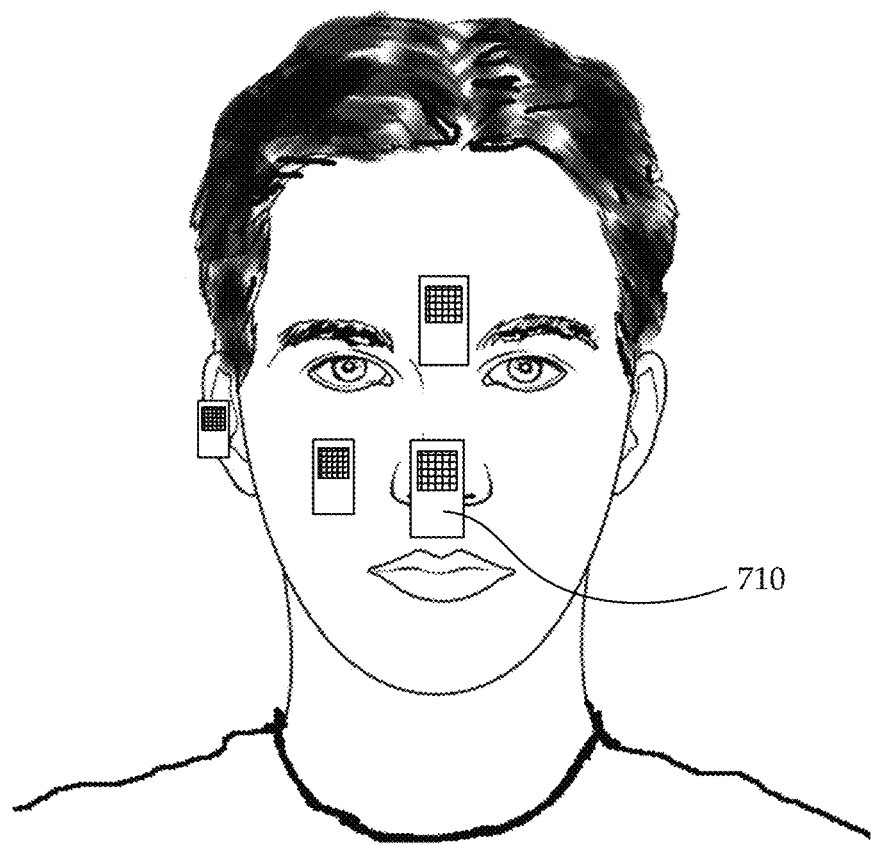
FIG. 7 shows an illustrative face image having one or more calibrators placed in the imaging area.

In other embodiments, it can be desirable to obtain one or more absolute measurements. In some such embodiments, calibrated chromatic differentiation can be used to derive at least one absolute depth measurement. In other such embodiments, measurements can be obtained (e.g., at least during registration) in context of a reference measurement guide. For the sake of illustration, FIG. 7 shows an illustrative face image having one or more calibrators 710 placed in the imaging area. The calibrators 710 can include any suitable reference measurement guide, such as a ruler, a grid, a frame, a barcode, or anything for which the absolute size is known to, or can be obtained by, the imaging system. In some implementations, the calibrator 710 is implemented on a transparent substrate, such as a ruler printed on a transparent sticker. The calibrator 710 can be placed in one or more locations. For example, a subset of the deterministic macro-structures can be defined for registration and calibration, and the calibrator 710 (or multiple calibrators 710) can be placed in or near those locations during a registration process.

Figure 8:
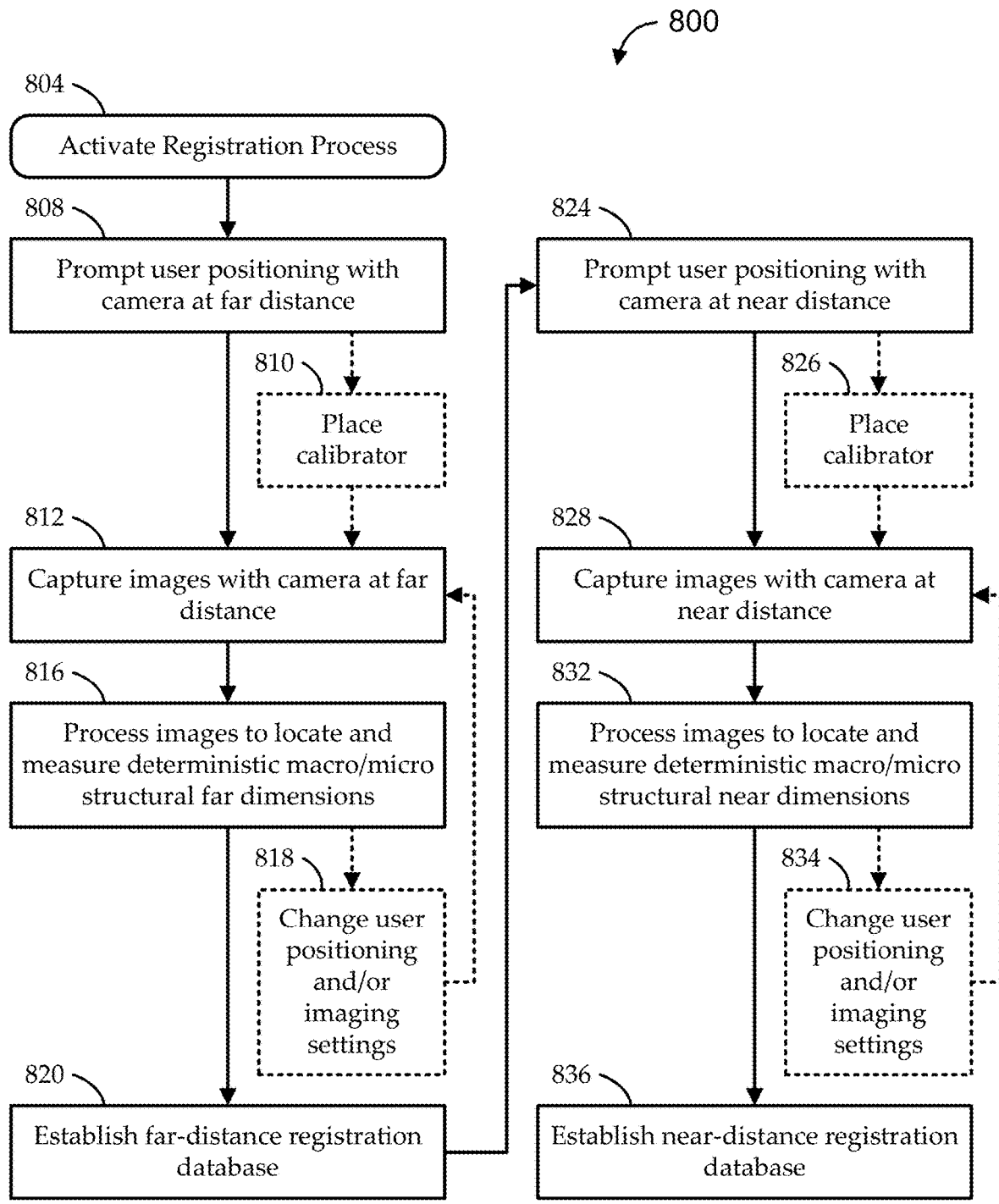
FIG. 8 shows a flow diagram of an illustrative method for registration of an authentication object, such as a user's face, according to various embodiments herein.

FIG. 8 shows a flow diagram of an illustrative method 800 for registration of an authentication object, such as a user's face, according to various embodiments herein. At stage 804, a registration routine is activated. For example, a face ID registration may be activated by an authorized user of a mobile device by selecting face ID registration in "settings," or when the mobile device is turned on by the authorized user for the first time after purchase. While described with reference to a face ID registration, or the like, the process 800 can be used for registering any suitable three-dimensional object that has deterministically measurable structures. As such, reference to "face ID" should be understood as generally referring to any suitable three-dimensional structural authentication. As described herein, the registration process can involve capturing and processing images of an object at different imaging distances in order to establish databases of measurements of macro-structures and/or micro-structures of the target. Relationships between the measurements can be used for biometric authentication, spoof detection, biometric identification, and/or other purposes.

At stage 808, the user is prompted to establish a "far distance" imaging setup. In the described sequence, one or more "far distance" imaging setups are followed by one or more near distance" imaging setups (e.g., beginning at stage 824). However, other implementations can begin with the near imaging setups and can be followed by the far distance imaging setups. Still other imaging setups can involve multiple setups at multiple distances in any suitable order. Each one or more far distance setup can involve positioning an imaging device (e.g., a smartphone camera, digital camera, biometric access system camera, etc.) at a far distance that is relatively far from the object (e.g., the user's face). In some embodiments, it is desirable for the far distance to be farther than a typical distance at which a user will likely seek to engage with the face ID system. For example, a user may typically engage with a smartphone face ID system while holding the smartphone approximately 20-40 centimeters from their face, and the user is prompted in stage 808 to hold the smartphone as far away from his or her face as is comfortable (e.g., at arm's length, such as approximately 45 centimeters). In stage 808, the user may also be prompted to orient his or her face in a particular manner. For example, the user may be instructed to look straight at the camera, to focus on a particular point on the screen, etc.

At stage 812, with the user and the imaging system in the far imaging setup, the camera can capture a set (i.e., one or more) of far-distance images (e.g., of the user's face). For example, the set of far-distance images can include one or more images under one or more imaging conditions, such as using one or more lighting conditions, one or more focus and/or zoom conditions, one or more cameras, one or more aperture or other optical settings, one or more orientations, etc. In some embodiments, at stage 810, prior to capturing some or all images at stage 812, the user can be instructed to place one or more calibrators (e.g., as in FIG. 7). For example, the one or more images captured in stage 708 in context of a reference measurement guide, such as a ruler. One or more of the set of far-distance images includes imaging of the one or more calibrators placed on the object being imaged. For example, a small ruler with markings at known spacing (e.g., each millimeter) is placed on the tip of the user's nose, on the users' forehead, etc.

At stage 816, embodiments can process the images to extract deterministic structural far dimensions. Some of the extracted deterministic structural far dimensions are clearly observable measurements of large-scale structural features of deterministic macro-structures. For example, images of a user's face can be processed to extract deterministic macro-structural far dimensions, such as eye corner locations, eye width, nose width, nose height, eye-to-eye spacing, etc. As described above, some of the extracted deterministic structural far dimensions can include measurements of small-scale structural features of deterministic micro-structures, which may or may not be easily observable without additional image processing. For example, certain macro-structural far dimensions and/or image processing techniques are used to identify regions of the object (e.g., face) images most likely to include deterministic micro-structure feature regions, such as relatively large skin areas generally lacking in deterministic macro-structures or other traceable structures (e.g., skin regions of the cheeks, forehead, nose, etc.). Such embodiments can then determine location definitions for each identified likely region (e.g., based on a set of reference points, reference lines, reference polygons, etc.). In some implementations, deterministic structural far dimensions (including macro-structural and/or micro-structural dimensions) are defined based on sets of coordinates in a reference coordinate plane that can be mathematically transformed (e.g., positioned, oriented, scaled, skewed, etc.) based on a subset of the measurements. For example, a small number of highly deterministic macro-structural dimensions can be used to generate a transformation matrix, and other extracted dimensions are defined relative in a same coordinate system as, or otherwise in relation to those highly deterministic macro-structural dimensions. As described above, some of the extracted deterministic structural far dimensions can include measurements of small-scale structural features of deterministic micro-structures derived by computing deterministic micro-structure from characteristic sub-images. Statistical processing, and/or other image processing, can be used to identify deterministic micro-structure textural signatures in the image data. For example, average peak heights, valley widths, and/or other data can be extracted from chromatic response data to indicate micro-textures of the region, such as due to pore patterns, and the like.

In some embodiments, at stage 818, one or more additional far distance imaging setups can be added to increase the amount of deterministic structural far dimension data. Embodiments can automatically change one or more imaging setting (e.g., focus, zoom, illumination, etc.), can prompt the user to manually change one more imaging settings, and/or can prompt the user to change orientation relative to the imaging system. For example, embodiments can prompt the user to turn and/or tilt the head in one or more directions and by one or more amounts. In each of the one or more additional far distance imaging setups, the method 800 can iterate back at least to capture additional far distance images at stage 812 and to process the additional far distance images at stage 816. Depending on sizes and orientations of different structural features of the object being imaged, different ones of the additional far distance imaging setups may tend to make certain structural features more or less prominent (e.g., an ear may be hidden at one orientation and visible at another, or a certain micro-structure textural signature may be clearly derivable only under a certain illumination and/or zoom condition), may impact relationships between deterministic structural far dimensions (e.g., eye corners may appear closer together when the eyes are looking straight at the camera relative to when the face is turned slightly away from the camera), and/or may confirm certain deterministic structural far dimensions and/or relations between deterministic structural far dimensions.

At stage 820, embodiments can establish a far distance registration database by storing deterministic structural far dimensions and/or additional data computed therefrom (e.g., transform matrices, etc.) in a data store. In come embodiments supporting multiple users, the database can be established for a particular authorized user. For example, a face ID database can store one or more registration profiles for one or more authorized users, and the stored deterministic structural far dimensions are associated with the registration profiles of the particular authorized user who activated the registration process at stage 804.

At stage 824, the user is prompted to establish a "near distance" imaging setup. In some embodiments, stages 824, 828, 832, and 836 (e.g., and stages 826 and/or 834, in some embodiments) are implemented in substantially the same manner as stages 808, 812, 816, and 820 (e.g., and stages 810 and/or 818, in some embodiments), respectively; except that stages 824-836 are performed under one or more near distance imaging setups. Each one or more near distance setup can involve positioning the imaging device (e.g., a smartphone camera, digital camera, biometric access system camera, etc.) at a near distance that is relatively near to the object (e.g., the user's face). In some embodiments, it is desirable for the near distance to be nearer than a typical distance at which a user will likely seek to engage with the face ID system. For example, as described above, a user may typically engage with a smartphone face ID system while holding the smartphone approximately 20-40 centimeters from their face, and the user is prompted in stage 824 to hold the smartphone as close to his or her face as possible, while still permitting the imaging device to fully image the face, and while still allowing the user to comfortably see the display (e.g., at approximately 15-20 centimeters). In some embodiments, it is primarily desirable that the near distance is substantially different from the far distance (e.g., at least 15 centimeters different), or the like. The user can be guided to choose appropriate distances in any suitable manner. In one implementation, the user is instructed generally to hold the imaging device "at arm's length" (or the like) in relation to stage 808, and is instructed generally to move the imaging device "as near to the face as you can while still having your entire face fit within the viewfinder" (or the like). In another implementation, a rangefinder (e.g., time of fly sensor, laser rangefinder, and/or other rangefinder) is used to provide feedback to the user (e.g., graphical, audible, visual, and/or other suitable feedback) that indicates whether the imaging device is at an appropriate relative position in stages 808 and 824. The same or different manners of guidance can be used in stages 808 and 824. In stage 824, the user may also be prompted to orient his or her face in a particular manner, such as by being instructed to look straight at the camera, to focus on a particular point on the screen, etc.

At stage 828, with the user and the imaging system in the near imaging setup, the camera can capture a set of near-distance images. The images can be captured at stage 828 in much the same manner as in stage 812. In some embodiments, at stage 826, prior to capturing some or all images at stage 828, the user can be instructed to place one or more calibrators to provide an absolute measurement reference. At stage 832, embodiments can process the images to extract deterministic structural near dimensions. The images can be processed at stage 832 in much the same manner as in stage 816. For example, the extracted deterministic structural near dimensions can include measurements of large-scale structural features of deterministic macro-structures, measurements of small-scale structural features of deterministic micro-structures, deterministic micro-structure textural signatures in the image data, and/or any other suitable dimensions. In some embodiments, at stage 834, one or more additional near distance imaging setups can be added to increase the amount of deterministic structural near dimension data. For example, as described with reference to stage 818, embodiments can automatically change one or more imaging settings, prompt the user to manually change one more imaging settings, and/or prompt the user to change orientation relative to the imaging system.

At stage 836, embodiments can establish a near distance registration database by storing deterministic structural near dimensions and/or additional data computed therefrom (e.g., transform matrices, etc.) in a data store. In some embodiments, the same data store (e.g., a same database) is used to store the near distance registration database and the far distance registration database. For example, all the deterministic structural far dimensions and deterministic structural near dimensions (e.g., and any other data derived therefrom) is stored in a single registration database. As described above, the near distance registration database, or the combined registration database, can be established for a particular authorized user who activated the registration process at stage 804.

Having established the registration database(s), various relationships can be established, and those relationships can be used to provide various features. The following Table 1 provides a number of illustrative relationships obtainable using the deterministic structural far dimensions and the deterministic structural near dimensions:

| Deterministic Structural Far Dimensions | | Deterministic Structural Near Dimensions | |
|---|---|---|---|
| Reference Structure | Other Structure | Reference Structure | Other Structure |
| Actual Hr | Actual Hj | Actual Hr | Actual Hj |
| Measured h1r | Measured h1j | Measured h2r | Measured h2j |

| Deterministic Structural Far Dimensions | | | | Deterministic Structural Near Dimensions | | | |
|---|---|---|---|---|---|---|---|
| Reference Structure | | Other Structure | | Reference Structure | | Other Structure | |
| Distance Unit | R1r Hr | Distance Unit | R1j Hr | Distance Unit | R2r Hr | Distance Unit | R2j Hr |
| | | $A1j = \dfrac{h1j}{h1r}$ | | | | $A2j = \dfrac{h2j}{h2r}$ | |
| $R1r \approx f * \dfrac{Hr}{h1r}$ | | $Hj = R1j * \dfrac{A1j}{R1r}$ | | $R2r \approx f * \dfrac{Hr}{h2r}$ | | $Hj = R2j * \dfrac{A2j}{R2r}$ | |

The left half of Table 1 shows deterministic structural far dimensions and relationships for two example structures: a reference structure (r), and an "other" structure (j). The right half of Table 1 shows deterministic structural near dimensions and relationships for that same two example structures. For example, a user's face is imaged, the reference structure is the height of the user's nose, and the other structure is the distance between the outer corners of the user's eyes. Regardless of the imaging distance, the actual dimensions of the structures stay the same (i.e., "Hr" for the reference structure, and "Hj" for the other structure). However, the measured dimension of the structures at the two differences will be different. As listed, the measured dimensions at the far distance (e.g., deterministic structural far dimensions obtained under one or more far imaging setups, as in stages 808-820 of FIG. 8) are "h1r" for the reference structure and "h1j" for the other structure, and the measured dimensions at the near distance (e.g., deterministic structural near dimensions obtained under one or more near imaging setups, as in stages 824-836 of FIG. 8) are "h2r" for the reference structure and "h2j" for the other structure.

The "Distance" listings in Table 1 represent the distance from the imaging system (e.g., the lens of the camera of the smartphone) to the measured structural feature. The far distances of the reference structure and the other structure (i.e., corresponding to the imaging system placed according to one or more far imaging setups) are listed in Table 1 as "R1r" and "R1j," respectively; and the near distances of the reference structure and the other structure (i.e., corresponding to the imaging system placed according to one or more near imaging setups) are listed in Table 1 as "R2r" and "R2j," respectively. As described herein, some embodiments use relative dimensioning. For example, the unit dimension ("Unit") being used in Table 1 is the actual dimension of the reference structure (Hr). That absolute measurement of that dimension may be unknown, but all other measurements, dimensions, computations, etc. can be relative to Hr, nonetheless. In other embodiments, one or more calibrators, and/or other techniques are used to establish an absolute reference dimension. In such embodiments, the reference unit dimension may be any consistent dimension that is not relative to a structure of the object being imaged, such as a millimeter, spacing or sizing of a template (e.g., having evenly spaces tick marks, equally sized geometric figures, etc.), etc.

Using the variables defined in Table 1, various relationships can be derived. It can be shown that the imaging distance of an imaging system is mathematically related (e.g., proportional) to the focal length (f) of the imaging system times a ratio between the actual and measured dimensions of an object: $R \approx f * H/h$. The value off can be known to the imaging system (e.g., or any other suitable processing system). In some implementations, f is a constant parameter of the components of the imaging system. In other implementations, f can change with different focal setups of the imaging system, such as if the imaging system is configured to auto-focus, or be manually focused. In such other implementations, the imaging system (or any other suitable processing system) can be aware of the current focal setup of the imaging system (e.g., by detecting relative positions of lenses, apertures, imaging planes, etc.) and can derive f accordingly, such as by looking up the value off in a lookup table, and/or by computing f as a function of relative positions of imaging components. Further, as described above, Hr is measurable based either on its own reference (e.g., Hr is established as a unit dimension, as in Table 1), or relative to a calibrator (e.g., as a certain number of millimeters). Thus, given f and Hr, the distance of the reference object (Rr) is inversely related to the measured dimension of the reference object hr.

Regarding the other object, various dimensions and other information can be derived in relation to those of the reference object and its own measurements. There is some difference in imaging distance (dj) between the imaging distance of the reference object (Rr) and the imaging distance of the other object (Rj), such that dj=Rr−Rj. For example, suppose a reference dimension extracted at the user's nose (the reference structure) is 300 millimeters away from the lens of the smartphone, and another dimension extracted from the user's eyes (the other structure) is 325 millimeters away from the lens of the smartphone; such that the other structure is 25 millimeters farther from the imaging system (i.e., dj=25 millimeters). Further, while the actual dimension of the other structure (Hj) may be unknown, it can be assumed that the ratio of Hj to Hr is the same as the ratio of hj to hr (i.e., the measured dimensions). A normalization factor (Aj) can be defined for the other structure as hj/hr. Based on the above relationships, the actual dimension of the other structure (Hj) relative to the unit structural dimension (Hr) can be expressed as Hj=Rj*Aj/Rr.

The actual dimensions of the reference structure and the other structure (Hr and Hj), and the relative difference in imaging distance (dj) between those structures are all structural features of the object being imaged and will not change with the imaging setup. However, measured dimensions will change at different imaging distances, and the normalization factor (Aj) will also change due to differences in image magnification at different distances. FIGS. 9A-9D show changing image magnification in example images 900 obtained by imaging an experimental setup at different imaging distances. The illustrated experimental setup includes a base with an array of identical spots. A platform 910 is placed on the base and also has an array of spots that are identical to each other and to the spots on the base. In particular, all the spots on the base and the platform are circles of the same diameter and spacing, such that the distance across five spots is 17.3 millimeters (mm).

Each image 900 shows the same experimental setup, but imaged from a different imaging distance. In particular, the imaging distance between the imaging system and the platform 910 for each of imaged 900a-900d is approximately 60 centimeters (cm), 40 cm, 25 cm, and 10 cm, respectively. The platform 910 is raised approximately 16.6 mm above the base. As such, in each image 900, the imaging distance to the base is 16.6 mm greater than the imaging distance to the platform 910. Even though the actual dimensions of the spots are identical on the base and on the platform 910, the measured dimensions are different due to the respective difference in imaging distance between the platform 910 and the base. Further, that respective difference is also different at different imaging distances due to image magnification differences, as can be seen by comparing the relative spot dimensions between the spots on the base and the spots on the platform 910 in each image 900.

Figure 9A:
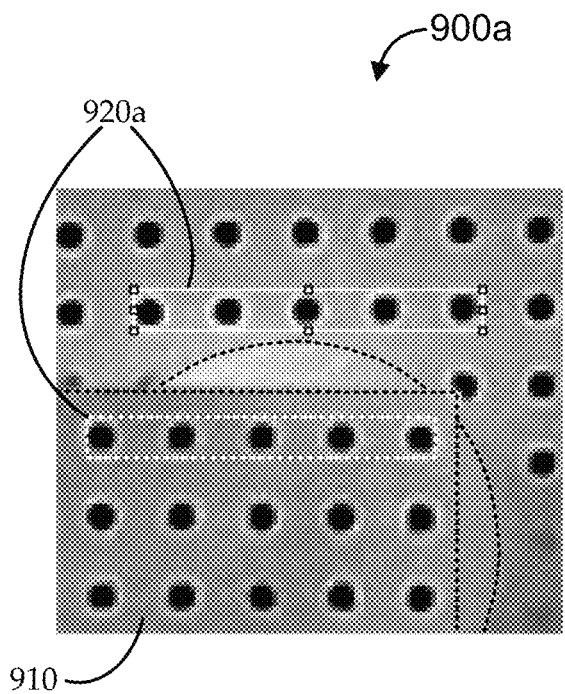
FIGS. 9A-9D show changing image magnification in example images obtained by imaging an experimental setup at different imaging distances.
Figure 9B:
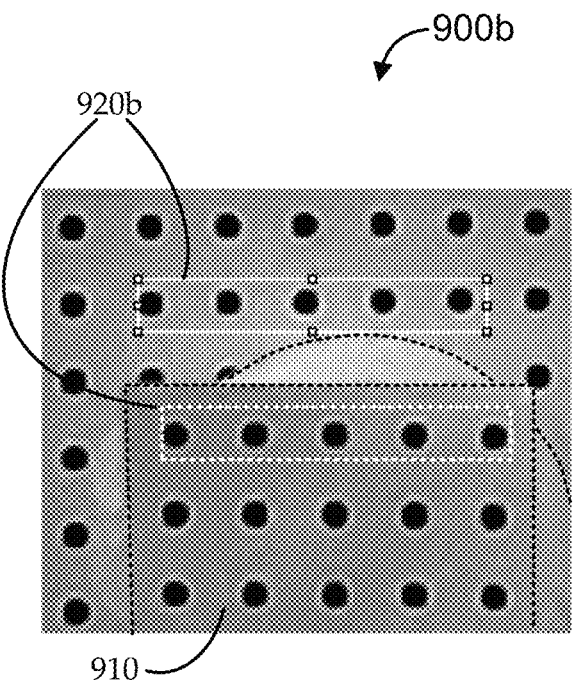
Figure 9C:
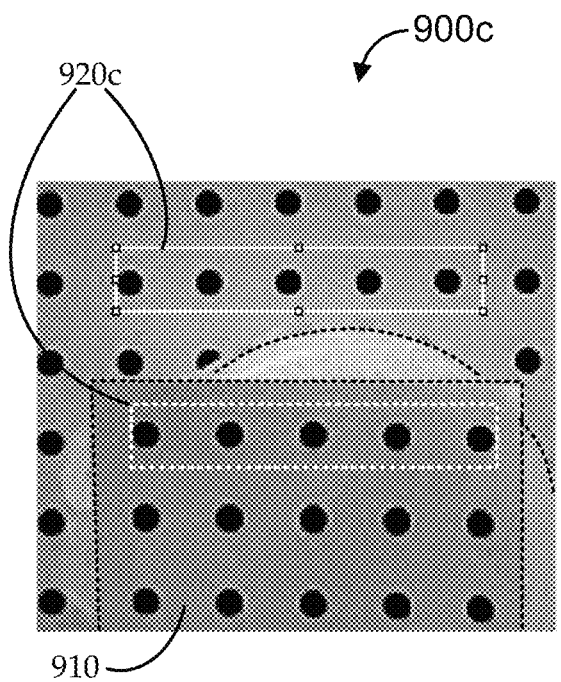
Figure 9D:
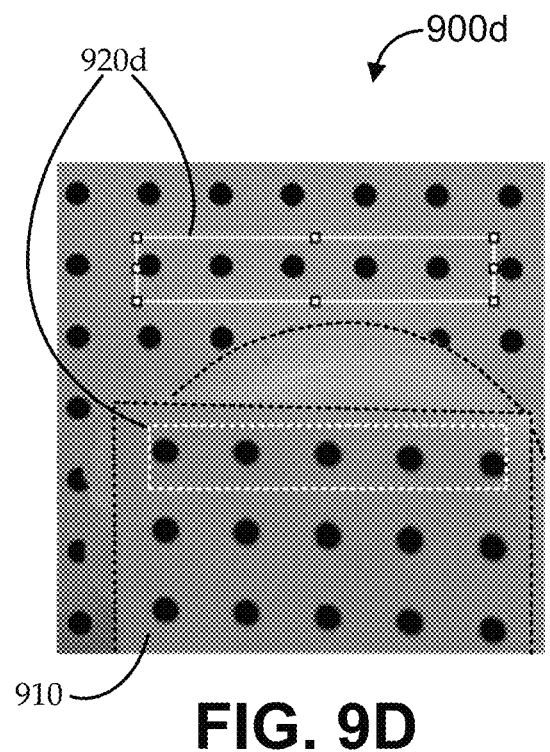

For example, in image 900a of FIG. 9A, the dashed version of rectangle 920a is sized to represent the span of 17.3 mm across five spots on the platform 910. An identically sized, but solid-line version of rectangle 920a is placed in context of five spots on the base, where it can be seen that the measured dimensions of those spots (which are 16.6 mm farther away from the imaging system) are very slightly smaller than those on the platform 910. In contrast, in image 900d of FIG. 9D, the dashed version of rectangle 920d is sized again to represent the span of 17.3 mm across five spots on the platform 910. Again, an identically sized, but solid-line version of rectangle 920d is placed in context of five spots on the base. In contrast to FIG. 9A, it can be seen in FIG. 9D that the measured dimensions of the further spots on the base are appreciably smaller than those on the platform 910.

Over FIGS. 9A-9D, it can be seen that the effect of the same 17.3 mm imaging distance difference on measured dimensions effectively magnifies as the object gets closer to the imaging system. Returning to Table 1, this magnification factor manifests a difference between a far normalization factor (A1j) defined as h1j/h1r, and a near normalization factor (A2j) defined as h2j/h2r. These normalization factors can be computed from the deterministic structural far dimensions in the far imaging setups and from the deterministic structural near dimensions in the near imaging setups. Based on the measured (or computed) A1j, A2j, h1r, h2r, and image lens focal length f, dj can be tested to be:

$$dj \approx (A2j - A1j) * f * \frac{Hr}{A2j * h2r - A1j * h1r}$$

Such a relationship, as established from the two (or more) imaging setups, can effectively yield the measured dimension (hdj) that should be obtained from any particular other structure (j) at any distance (d).

While the magnification factor demonstrated by FIGS. 9A-9D can help establish three dimensional information, it also suggests that depth resolution may be poor at larger imaging distances. In some embodiments, one or more of the imaging setups includes zooming in of the imaging system. As one example, the inventors have experimentally demonstrated that, if the reference dimension is known, the passive sensing approaches described herein can achieve approximately 2 mm of depth resolution at 25 cm distance with an 8-Megapixel camera (e.g., the measured dimensions between the spots on the base and the spots on the platform 910 differed by 8 pixels for the 16.6 mm of difference in imaging distance). Setting the imaging system to zoom in by 2× was demonstrated also to yield approximately 1 mm of depth resolution (i.e., approximately double the depth resolution).

Figure 10:
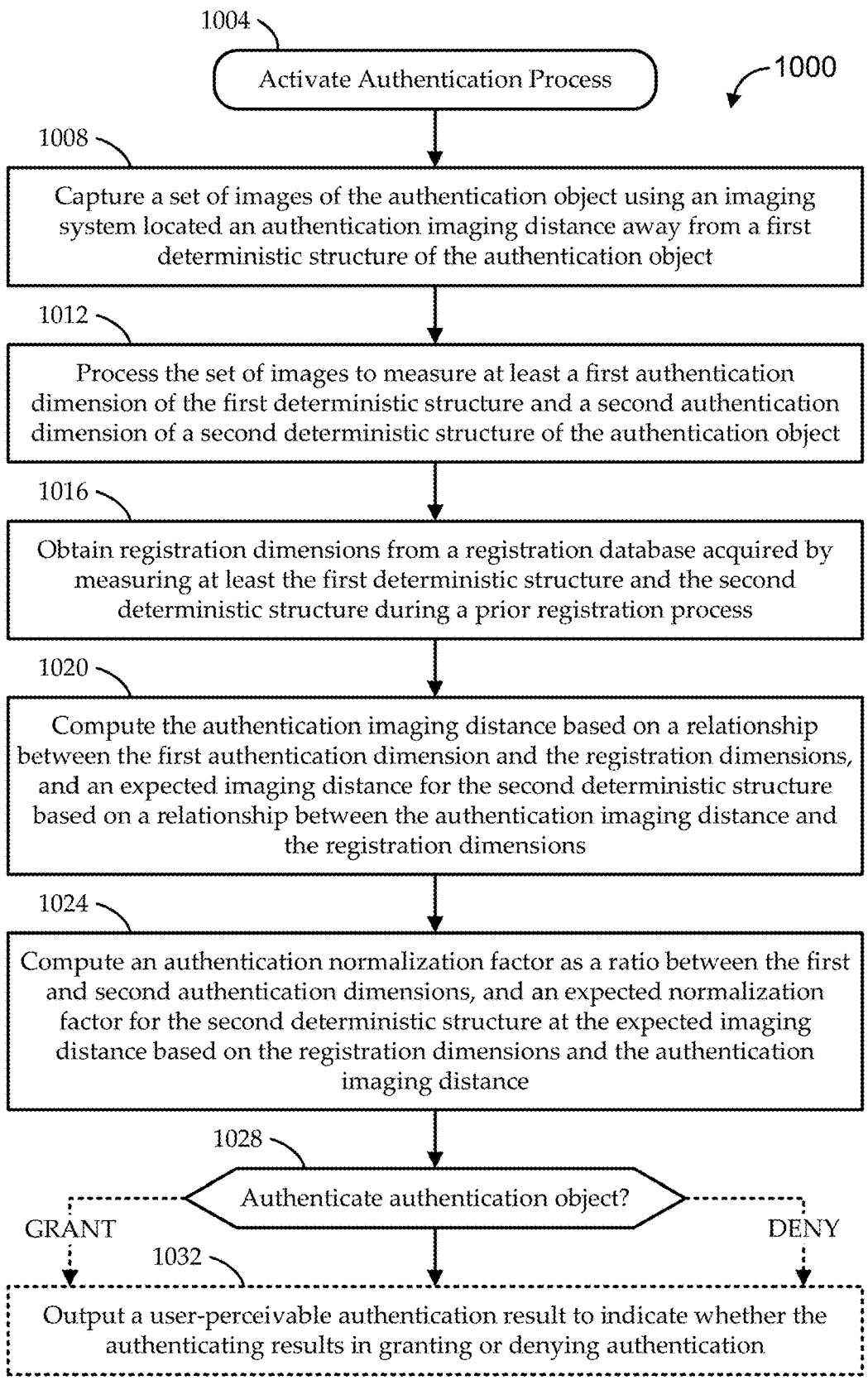
FIG. 10 shows a flow diagram of an illustrative method for authentication of an authentication object by passive imaging of three-dimensional deterministic structures of the authentication object, according to various embodiments herein.

FIG. 10 shows a flow diagram of an illustrative method 1000 for authentication of an authentication object by passive imaging of three-dimensional deterministic structures of the authentication object, according to various embodiments herein. As described above, in some implementations, the three-dimensional deterministic structures of the authentication object can be deterministic macro- and/or microstructures of a human user's face. It can be assumed that the authentication object being authenticated in the method 1000 was previously registered by a registration process, such as by the method 800 of FIG. 8. At stage 1004, a registration routine is activated. For example, a face ID authentication routine is activated by a purportedly authorized user of a mobile device in connection to the user attempting to unlock the phone (from a locked state), to authorize a mobile payment transaction, to authorize user credentials for an application, etc. As described herein, the authentication routine can be configured for different levels and/or types of authentication. Some embodiments provide biometric authentication, for example, by obtaining sufficient deterministic structural dimensions of the authentication object to support finding a statistical match with previously registered structural dimensions of the authentication object. Other embodiments additionally, or alternatively provide spoof detection, for example, by obtaining three-dimensional dimensions, textural signatures, and/or other types of information that tend to be impractical (or practically impossible) to reproduce with spoofing techniques. Other embodiments additionally, or alternatively provide biometric identification detection, for example, by obtaining sufficient deterministic structural dimensions of the authentication object to support identifying the authentication object from among a large population of candidate authentication objects with sufficient statistical confidence.

For any of biometric authentication, spoof detection, biometric identification, and/or other uses, aspects of the registration routine (e.g., of FIG. 8) and the authentication routine 1000 can be configured to collect and process different numbers and types of dimensions and dimensional relationships to satisfy potentially competing design considerations. For example, increasing the number of data points on which authentication relies and/or increasing a threshold confidence level needed for positive authentication can increase the security provided by the authentication routine. However, such increased security can also take more processing time and other processing resources for each authentication determination, can result in more "false negatives" (e.g., where an authorized user is denied authorization by the routine because the routine was unable to achieve sufficient confidence in its determination), and/or can otherwise cause frustrations with usage. As such, for some types of applications (e.g., unlocking a consumer smartphone for typical daily usage), it is desirable to tune the routines to favor convenience over security to some extent. For example, decreasing the number of data points and/or confidence levels used for authentication can reduce the level of security (e.g., producing more false positives, etc.), but may still provide a sufficient level of security for the application while also improving the end user experience (e.g., by increasing response speed, reducing false negatives, etc.).

At stage 1008, embodiments can capture a set of images of the authentication object (e.g., a user's face) using an imaging system. For example, the authentication object is a user's face, and the imaging system is integrated into a smartphone, a computer (e.g., a laptop, desktop, tablet, etc.), an electronic reader device, an automated teller machine, a wearable device, a biometric physical access control system (e.g., a biometric door lock), etc. In some embodiments, the user is prompted, and/or otherwise guided, into a desired imaging setup. The user can be guided to ensure that the authentication object is an appropriate imaging distance away from the imaging system, to ensure that the authentication object is oriented in a desired manner with respect to the imaging system, etc. For example, the user is prompted to look straight ahead at a particular point on a display, thereby tending to guide the user's face (as the authentication object) into a relatively small range of distances and orientations that likely match with a registered set of imaging conditions.

During capturing at stage 1008, the imaging system is located an authentication imaging distance away from the first deterministic structure of the authentication object. As described herein, the imaging system is some respective imaging distance away from each of one or more other deterministic structures. Each of those respective imaging distances is a respective delta (difference) from the authentication imaging distance. The first deterministic structure and the one or more other deterministic structures are visible in the set of images (e.g., fewer than all of the deterministic structures may be visible in any of the set of images). The "imaging distance" can be referenced to any suitable component of the imaging system, such as to a focal plane of a lens of the imaging system. In some implementations, it is expected that the imaging distance being used for authentication is closer than the "far distance" used for registration and/or closer than the "near distance" used for registration. For example, in context of face ID, or the like, a user may tend to hold the smartphone at a comfortable distance from his or her face; which may naturally be between the distances used to capture images during registration. In other implementations, any other imaging distance can be accommodated, as long as the distance is far enough from the imaging system so that each captured image includes a sufficient set of deterministic structures to support providing a desired level of authentication of the authentication object, and as long as the distance is close enough to the imaging system to provide sufficient depth resolution to support providing a desired level of authentication of the authentication object. As described above, some embodiments support manually and/or automatically zooming the imaging system to enhance depth resolution. For example, embodiments can automatically zoom, or prompt the user to manually zoom, based on detecting that the imaging distance is beyond a threshold imaging distance from the authentication object.

At stage 1012, embodiments can process the set of images to measure at least a first authentication dimension of the first deterministic structure and a second authentication dimension of the second deterministic structure. At least the first and second deterministic structures are visible in the set of images. For example, as described with reference to FIG. 8, the first deterministic structure can be any suitable reference structure from which to obtain the first authentication measurement as a deterministic reference dimension (e.g., the height of the nose). Each additional deterministic structure can be any suitable macro-structure or micro-structure from which to obtain a respective additional authentication measurements as another respective deterministic structural dimension (e.g., the width of the left eye, a dimension within a textural signature along the user's forehead, etc.).

At stage 1016, embodiments can obtain registration dimensions from a registration database acquired by measuring at least the first deterministic structure and the second deterministic structure during a prior registration process. In some embodiments, the obtaining in stage 1016 includes obtaining a first registration dimension acquired by measuring the first deterministic structure during a registration process, a second registration dimension acquired by measuring the second deterministic structure during the registration process, and a registration imaging distance delta between the first and second deterministic structures computed during the registration process (e.g., referred to as "dj" above). Performance of stage 1016 can assume that the particular first authentication measurement and respective additional authentication measurements generated at stage 1012 correspond to structural dimensions that were previously registered during the registration process. For example, with reference to Table 1 above, the first registration dimension can be Hr, the second registration dimension can be Hj, and the registration imaging distance delta can be dj. The measurements obtained in stage 1016 can be obtained from any suitable registration database or databases. For example, as described with reference to FIG. 8, relevant registration information may be stored in a single registration database, in far and near registration databases, etc.

At stage 1020, embodiments can compute the authentication imaging distance based on a relationship between the first authentication dimension and the registration dimensions, and can compute an expected imaging distance for the second deterministic structure based on a relationship between the authentication imaging distance and the registration dimensions. In some embodiments, the authentication imaging distance is computed based on the first registration dimension, the first authentication dimension, and a focal characteristic of the imaging system. As described above, the first imaging distance (R3r) can be functionally related to the focal length (f) of the imaging system times a ratio between the first registration dimension (Hr) and the first authentication dimension (h3r). For example, referring to equations provided above, the first imaging distance can be computed as: R3r=f*Hr/h3r. In some embodiments, the expected imaging distance is computed for the second deterministic structure based on the first imaging distance and the registration imaging distance delta. For example, during registration, the registration imaging distance delta is computed based on relationships between deterministic structural far dimensions and deterministic structural near dimensions. Notably, the dimensions obtained in stage 1016 (Hr, Hj, and dj) are actual structural dimensions of the authentication object that are independent of any imaging setup (e.g., the width of a person's eye does not change based on the position of the imaging system, focal length, lighting, etc.). As such, if the authentication object is the same object that was registered, Rj should always be dj away from Rr, regardless of the value of Rr. Thus, at stage 1020, the expected imaging distance (R3je) for the second deterministic structure is dj greater than (or less than, if dj is negative) the first imaging distance (R3r) also computed in stage 1020.

At stage 1024, embodiments can compute an authentication normalization factor as a ratio between the first and second authentication dimensions, and can compute an expected normalization factor for the second deterministic structure at the expected imaging distance based on the registration dimensions and the authentication imaging distance. As described above, the normalization factor (Aj) for the second deterministic structure at the particular set of imaging distances being used for authentication represents a ratio of the measured dimensions of the deterministic structures at that imaging distance. As such, consistent with equations provided above, the authentication normalization factor (A3j) can be computed as the ratio between the first and second authentication dimensions: A3j=h3j/h3r. As derived with reference to Table 1, it is expected that the normalization factor for the second deterministic structure at any particular imaging distance is functionally related to the actual size of the second deterministic structure and the ratio of imaging distances between the first and second deterministic structures. Based on the registration information and referring to equations provided above, an expected normalization factor (A3je) for the particular set of imaging distances being used for authentication can be computed as: A3je=Hj*R3r/R3je.

At stage 1028, embodiments can make a determination as to whether to authenticate the authentication object based on comparing the authentication normalization factor with the expected normalization factor. The expected normalization factor is computed based on data obtained during prior registration of the "real" authentication object, and the authentication normalization factor is computed based on data measured during the present authentication (at stage 1012) of the "purported" authentication object (i.e., the authentication object purported to be the real authentication object, and undergoing authentication, accordingly). If the purported authentication object is not the real authentication object, the authentication normalization factor will presumably fail to match the expected normalization factor, and authentication can be denied. If the purported authentication object is, indeed, the real authentication object, the authentication normalization factor will presumably match the expected normalization factor, and authentication can be granted.

A match can be determined in any suitable manner and to any predetermined confidence level. In some embodiments, determination of a match involves determining a match between at least a predetermined minimum number of deterministic structural dimensions. A single iteration of the method 1000 may only provide a single data point for determining a match. For example, the first and second deterministic structures are used together (one as a reference for the other) to establish a single authentication normalization factor to be compared with a single expected normalization factor. Embodiments can iterate multiple times through method 1000 (e.g., through stages 1012-1028) to obtain multiple authentication normalization factors and expected normalization factors for the same second deterministic structure, and/or for one or more additional deterministic structures; and determining whether there is a match at stage 1032 can be based on matching some or all of the multiple authentication normalization factors with some or all of the expected normalization factors.

In some embodiments, determining whether there is a match at stage 1032 can involve additional computations and/or processing. For example, because the registration images and the authentication images are captured at different times, it can be expected that sets of images, measured dimensions, dimensional relationships, etc. may not match exactly. As such, determination of a match may involve application of statistical computations to determine a confidence level between the registration and authentication datasets. For example, a "match" may be defined as meeting at least a threshold magnitude of statistical correlation (e.g., 95%) between one or more sets of relevant dimensions. In some cases, prior to performing any type of matching determination, one or more types of three-dimensional transformations (e.g., rotation, skew, scale, etc.) are applied in an attempt to establish an equivalent (or substantially equivalent) dimensional basis for performing the matching determination between the registration and authentication datasets. In some embodiments, a settings portal can be provided by which an authorized user, an administrator, a provider, etc. can adjust parameters, such as the threshold statistical confidence level for determining a match, the number of data point to collect and use, etc. Adjusting such settings can facilitate changing the operational balance between user experience and level of security. For example, an authorized user can adjust the settings to increase the level of security at the expense of increased processing resources and potentially increased false negatives (and associated frustration of incorrectly being denied access); or, alternatively, the authorized user can adjust the settings to increase the level of convenience (e.g., with faster response time, fewer false negatives, etc.) at the expense of decreased security (e.g., a potential increase in false positives).

In some embodiments, at stage 1036, a user-perceivable authentication result can be output based on the determination in stage 1032 to indicate whether the authenticating results in granting or denying authentication. For example, visible, audible, tactile, and/or other responses can be output by the imaging system, or by any suitable system coupled in communication with the imaging system. In one example, in context of face ID used for access control of a smartphone, a successful authentication determination at stage 1032 can result in the smartphone unlocking to permit access at stage 1036 (e.g., the output at stage 1036 manifests as the display switching away from a lock screen). In another example, in context of a biometric physical access control system, a successful authentication determination at stage 1032 can result in a physical door unlocking to permit access at stage 1036 (e.g., the output at stage 1036 is a signal to a door lock mechanism). In another example, in context of general biometric authentication, a successful authentication determination at stage 1032 can result in an output at stage 1036 in the form of an indicator light illuminating, a graphical display element on a display changing appearance, a component vibrating, an audible chime playing through a speaker, etc.

Figure 11:
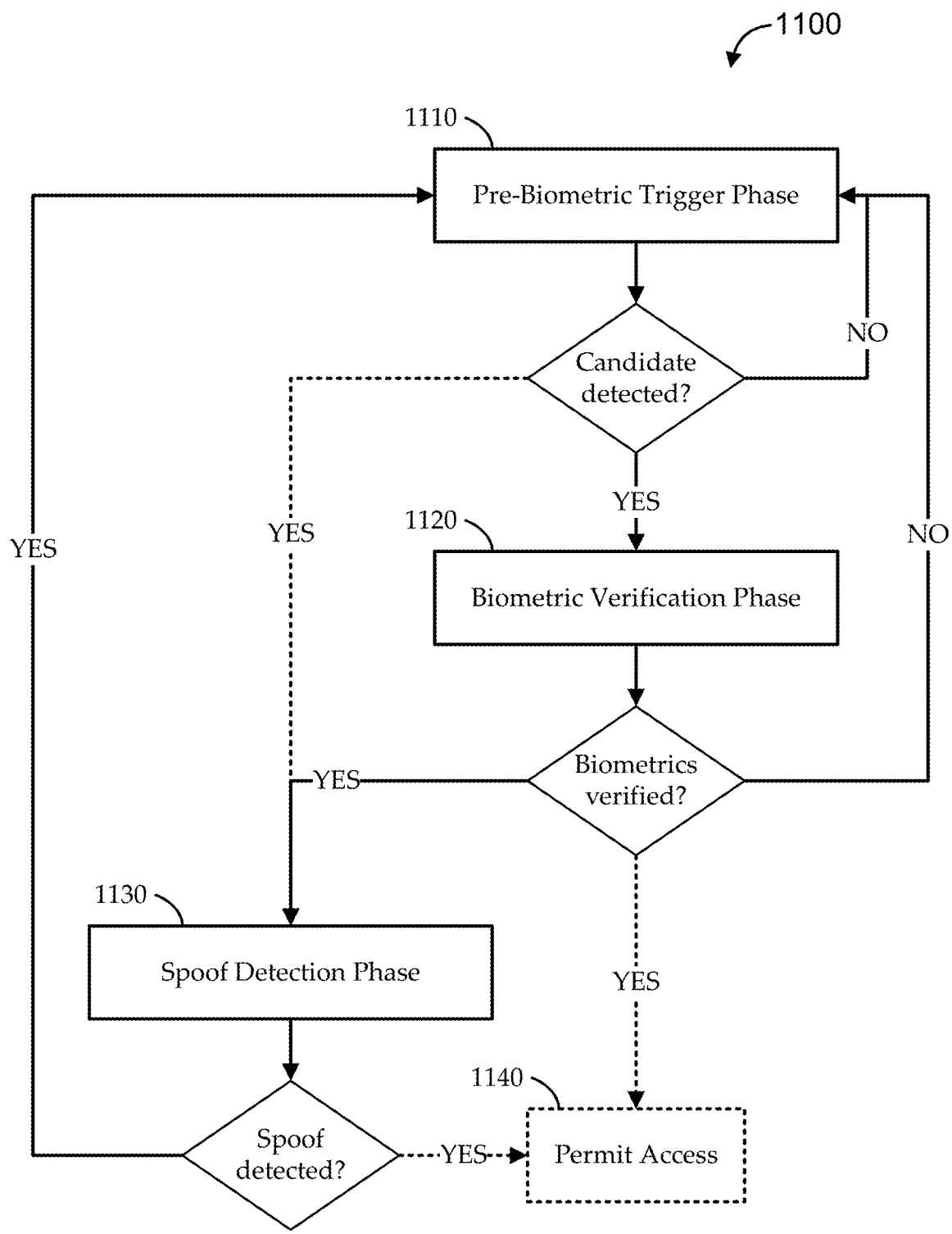
FIG. 11 shows a flow diagram of an example gated process for access control, according to various embodiments.

FIG. 11 shows a flow diagram of an example gated process 1100 for access control, according to various embodiments. For example, a user can seek access to a smart phone having an integrated image sensor system, such as described herein. Access to the smart phone is locked until the user successfully passes a biometric verification of the user's face based on previously registered data. Biometric verification (or authentication) generally refers to verifying biometrics of a candidate user (or other object) against corresponding biometrics of a previously registered user. For example, even though the term "biometric" relates to a biological feature, the term is used herein more generally to refer to structures having deterministic dimensions that are sufficiently unique to the object being authenticated as to be useful for authentication. For example, while biometric structures of a person's face may be part of the persons biology, inorganic and/or inanimate objects can include structures that are sufficiently deterministic and unique to be characteristic of that specific object.

Biometric verification can be much simpler than so-called biometric identification. For example, biometric identification may seek to determine the identity of a candidate user from a general population of users, such as my determining whether a fingerprint matches any of a large database of fingerprints to at least some threshold confidence level; while biometric verification can begin with an assumed set (e.g., one, or a relatively small number) of pre-registered users, and can seek to determine whether a current candidate user seems to match one of the assumed set of users to a threshold level of confidence. Biometric access control systems, like those of the example smart phone, are typically based on biometric verification. For example, the smart phone (or similarly, an identification badge, an electronic door lock, etc.) may only be associated with a single authorized user, and the function of the system is to determine whether a candidate user attempting access appears (e.g., statistically) to be the authorized user. Such a function does not require the system to search a huge database in an attempt to identify the candidate user.

In a pre-biometric trigger phase 1110, embodiments can wait to detect a candidate image or images, which can trigger further biometric verification. In some cases, the pre-biometric trigger phase 1110 is, itself, triggered to begin by one or more other trigger conditions. For example, the pre-biometric trigger phase 1110 begins after a user presses a button, inputs a code, turns on a device, etc. In some other cases, the image sensor can continuously, periodically, or otherwise obtain images. The images can be dynamically processed to detect a set of image data that is generally characteristic of a face, or otherwise of a candidate for biometric verification. For example, certain traceable structures (e.g., macro- and/or micro-structures) are detected in a particular pattern (e.g., at relative locations, sizes, etc.) that indicate to the system that the captured image is a candidate face image for biometric processing. In some implementations, this phase 1110 can use various techniques to improve the detection of such traceable structures. For example, the phase 1110 can include focusing the imaging system based on one or more parameters, such as based on a chromatic component; and/or the phase 1110 can include analysis of individual chromatic components of the raw image data (e.g., including computing statistical analyses of image brightness plots, etc.); and/or the phase 1110 can involve correcting imaging data for parameters, such as contrast, spectrum reflectance, spectrum illumination inequality, surface transmission, etc.

In a biometric verification phase 1120, the same and/or different traceable structures are used for biometric verification of the pre-registered user. In some implementations, the imaging data obtained in phase 1110 is sufficient for the biometric verification in phase 1120. In other implementations, additional and/or different imaging data is obtained, such as high-definition data with multiple chromatic components. In some embodiments, the phase 1120 can involve resizing and/or reorienting the obtained data, and/or correcting the data for size and/or orientation. For example, as described above, certain traceable structures have known sizes, certain distances are known between traceable structures, etc. Comparing such known information to the obtained information can provide information as to the distance of the imaged object from the imaging system (e.g., objects appear smaller as they move farther from the imaging system), and/or to the orientation of the imaged object with respect to the imaging system (e.g., when the imaged object is tilted, its set of traceable structures is tilted in a deterministic manner). In some implementations, parameters of the imaging system are also known and can be used in this phase 1120.

Some embodiments of the biometric verification phase 1120 follow the stages of method 1000 of FIG. 10. For example, the pre-biometric trigger phase 1110 captures relatively low-resolution information intended generally and rapidly to inform the imaging system that there appears to be a candidate object in an imaging field of the imaging system that is of the type used for authentication. Upon triggering the biometric verification phase 1120, the candidate object becomes a purported authentication object, and the biometric verification phase 1120 seeks to determine whether to authenticate the purported authentication object. Some embodiments end with successful passage of the biometric verification phase 1120. For example, passing the biometric verification phase 1120 triggers output of a verification signal (e.g., as in stage 1032 of FIG. 10). In some embodiments, the verification signal (or additional signals) trigger an access control system to permit access at phase 1140 (e.g., the smart phone unlocks).

Other embodiments further include a spoof detection phase 1130. For example, successful passage of the biometric verification in phase 1120 can trigger an additional hurdle of the spoof detection phase 1130, which must also be passed prior to permitting access by an access control system at stage 1140. As described above, such a spoof detection phase 1130 can use information obtained in the biometric verification phase 1120, and/or can obtain any suitable information, to determine whether the candidate object is a spoof. For example, establishing even one, or a small number, of three-dimensional relationships between macro-structures of the purported authentication object can be sufficient to differentiate between a "real" three-dimensional face and a printed photograph of the same face. However, those same measurements may not be sufficient to detect a three-dimensional spoof, such as a 3D sculpture of a face in wax or latex, mask prosthetics being worn over a human face, high-resolution photographic printing, etc. In such cases, micro-structural dimensions, textural signatures, multi-spectral information, and/or other information can be used in the spoof detection phase 1130 (and obtained in the spoof detection phase 1130, if not obtained earlier) to detect other types of spoofs.

Some embodiments may include only one or two of the phases of the flow diagram 1100, and the various phases can be performed in any order. In some embodiments, the spoof detection phase 1130 and the biometric verification phase 1120 are performed sequentially. For example, successful passage of the biometric verification phase 1120 triggers a start of the spoof detection phase 1130. In other embodiments, the biometric verification phase 1120 and the spoof detection phase 1130 are performed concurrently (i.e., at least partially in parallel). In some embodiments, some or all phases can be independently triggered. For example, a user can explicitly trigger a biometric verification phase 1120, such that the phase 1120 is not responsive to successful identification of a candidate in phase 1110. Similarly, a user can explicitly trigger a spoof detection phase 1130 without an associated biometric verification phase 1120. For example, there may be an instance where the user desires to know whether an object is a spoof without determining any type of biometric verification of the object.

Figure 12:
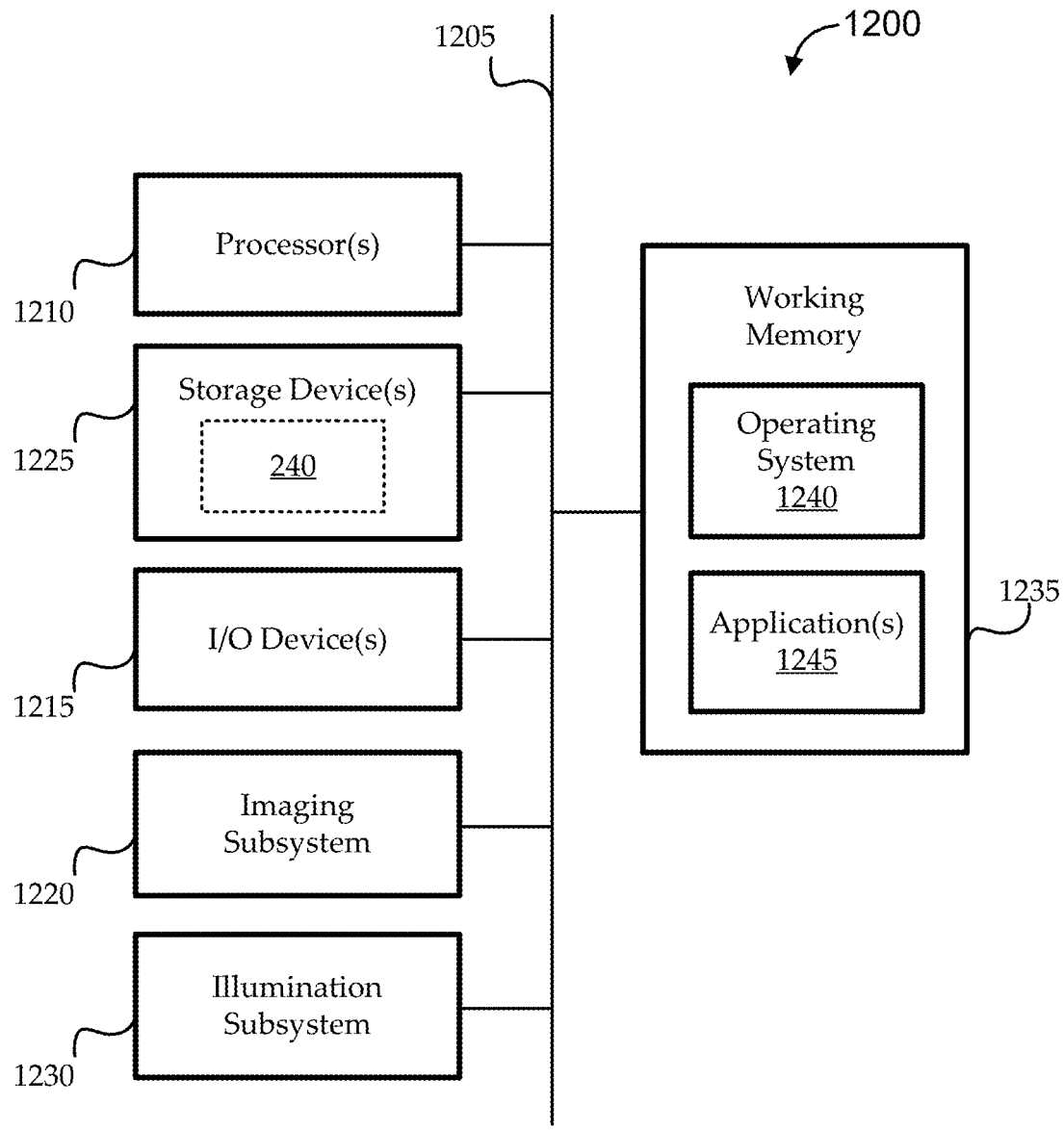
FIG. 12 provides a schematic illustration of one embodiment of a computer system that can implement various system components and/or perform various steps of methods provided by various embodiments.

FIG. 12 provides a schematic illustration of one embodiment of a computer system 1200 that can implement various system components and/or perform various steps of methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown including hardware elements that can be electrically coupled via a bus 1205 (or may otherwise be in communication, as appropriate). The hardware elements may include one or more processors 1210, including, without limitation, one or more general-purpose processors and/or one or more special-purpose processors (such as digital signal processing chips, graphics acceleration processors, video decoders, and/or the like). For example, processors 1210 can implement control and processing module 230 shown in FIG. 2. Some embodiments include one or more input/output (I/O) devices 1215. In some implementations, the I/O devices 1215 include human-interface devices, such as buttons, switches, keypads, indicators, displays, etc. In other implementations, the I/O devices 1215 include circuit-level devices, such as pins, dip-switches, etc. In some implementations, the computer system 1200 is a server computer configured to interface with additional computers and/or devices, such that the I/O devices 1215 include various physical and/or logical interfaces (e.g., ports, etc.) to facilitate hardware-to-hardware coupling, interaction, control, etc. In some embodiments, the I/O devices 1215 implement output interface 250 of FIG. 2.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 1225 include registration database(s) 240 of FIG. 2.

The computer system 1200 can also include, or be in communication with, any other components described herein. In some embodiments, the computer system 1200 includes an imaging subsystem 1220. The imaging subsystem 1220 can include the imaging components 210 of FIG. 2, and/or any other supporting components for imaging, as described herein. In some embodiments, the computer system 1200 includes an illumination subsystem 1230. The illumination subsystem 1230 can include any suitable illumination sources for projecting normal illumination and/or reference illumination into a field of view of the imaging subsystem 1220, and any supporting components. In some such embodiments, the illumination subsystem 1230 includes one or more of illumination sources to provide reference illumination flooding and/or to provide one or more types of probe illumination. Some embodiments can include additional subsystems, such as a communications subsystem (not shown) to communicatively couple with other systems, networks, etc.

Embodiments of the computer system 1200 can further include a working memory 1235, which can include a RAM or ROM device, as described herein. The computer system 1200 also can include software elements, shown as currently being located within the working memory 1235, including an operating system 1240, device drivers, executable libraries, and/or other code, such as one or more application programs 1245, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. A set of these instructions and/or codes can be stored on a non-transitory computer-readable storage medium, such as the non-transitory storage device(s) 1225 described above. In some cases, the storage medium can be incorporated within a computer system, such as computer system 1200. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 1200 and/or can take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 1200) to perform methods in accordance with various embodiments of the invention. According to a set of embodiments, some or all of the procedures of such methods are performed by the computer system 1200 in response to processor 1210 executing one or more sequences of one or more instructions (which can be incorporated into the operating system 1240 and/or other code, such as an application program 1245) contained in the working memory 1235. Such instructions may be read into the working memory 1235 from another computer-readable medium, such as one or more of the non-transitory storage device(s) 1225. Merely by way of example, execution of the sequences of instructions contained in the working memory 1235 can cause the processor(s) 1210 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1200, various computer-readable media can be involved in providing instructions/code to processor(s) 1210 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 1200.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A method for authentication of an authentication object based on passive imaging, the method comprising:

capturing a set of images of the authentication object using an imaging system located an authentication imaging distance away from a first deterministic structure of a plurality of deterministic structures of the authentication object that are visible in the set of images;

processing the set of images to measure at least a first authentication dimension of the first deterministic structure and a second authentication dimension of a second deterministic structure of the plurality of deterministic structures;

obtaining registration dimensions from a registration database acquired by measuring at least the first deterministic structure and the second deterministic structure during a prior registration process; computing the authentication imaging distance based on a relationship between the first authentication dimension and the registration dimensions, and computing an expected imaging distance for the second deterministic structure based on a relationship between the authentication imaging distance and the registration dimensions;

computing an authentication normalization factor as a ratio between the first and second authentication dimensions, and computing an expected normalization factor for the second deterministic structure at the expected imaging distance based on the registration dimensions and the authentication imaging distance; and authenticating the authentication object based on comparing the authentication normalization factor with the expected normalization factor; wherein the authentication imaging distance is computed as a function of a focal characteristic of the imaging system and a ratio between a first registration dimension and the first authentication dimension, the first registration dimension acquired by measuring the first deterministic structure during the prior registration process.

2. The method of claim 1, further comprising:

outputting a user-perceivable authentication result to indicate whether the authenticating results in granting or denying authentication.

3. The method of claim 1, wherein the obtaining registration dimensions comprises obtaining, from the registration database, a first registration dimension acquired by measuring the first deterministic structure during the prior registration process, a second registration dimension acquired by measuring the second deterministic structure during the prior registration process, and a registration imaging distance delta between the first and second deterministic structures computed during the registration process.

4. The method of claim 3, wherein the second registration dimension, the first authentication dimension, and the second authentication dimension are measured according to a unit dimension defined during the prior registration process based on the first registration dimension.

5. The method of claim 1, wherein the expected imaging distance is computed for the second deterministic structure by adding the authentication imaging distance to a registration imaging distance delta, the registration imaging distance delta being a difference between the respective imaging distances from the imaging system to each of the first and second deterministic structures during the prior registration process.

6. The method of claim 1, wherein the expected normalization factor for the second deterministic structure is computed as a function of a second registration dimension and a ratio between the authentication imaging distance and the expected imaging distance, the second registration dimension acquired by measuring the second deterministic structure during the prior registration process.

7. The method of claim 1, wherein the capturing comprises capturing at least one of the set of images with the imaging system zoomed in on the authentication object to form the at least one of the set of images with increased depth resolution.

8. The method of claim 1, wherein:
the plurality of deterministic structures comprises the first deterministic structure, and a plurality of other deterministic structures that includes the second deterministic structure;
the processing the set of images comprises processing the set of images to measure the first authentication dimension for the first deterministic structure and a respective other authentication dimension for each of the plurality of other deterministic structures;
the obtaining registration dimensions comprises obtaining registration dimensions acquired by measuring the first deterministic structure and the plurality of other deterministic structures during the prior registration process;
the computing the expected imaging distance comprises computing a respective expected imaging distance for each of the plurality of other deterministic structures;
the computing the authentication normalization factor comprises computing a respective authentication normalization factor for each of the plurality of other deterministic structures;
the computing the expected normalization factor comprises computing a respective expected normalization factor for each of the plurality of other deterministic structures at the respective expected imaging distance; and
the authenticating the authentication object is based on comparing a plurality of the respective authentication normalization factors with a corresponding plurality of the respective expected normalization factors.

9. The method of claim 8, wherein:
at least a first of the plurality of other deterministic structures of the authentication object is a macro-structure; and
at least a second of the plurality of other deterministic structures of the authentication object is a micro-structure.

10. The method of claim 1, wherein the authenticating the authentication object comprises both biometric verification and spoof detection based on at least a portion of the plurality of deterministic structures of the authentication object.

11. A system for authentication of an authentication object based on passive imaging, the system comprising:
a registration database having, stored thereon, a plurality of registration dimensions acquired by measuring a plurality of deterministic structures of an authentication object during a prior registration process;
an imaging subsystem to capture a set of images of the authentication object while the authentication object is an authentication imaging distance away from a first deterministic structure of the plurality of deterministic structures; and
a control and processing module having one or more processors and a memory having, stored thereon, a set of instructions which, when executed, cause the one or more processors to perform steps comprising:
processing the set of images to measure at least a first authentication dimension of the first deterministic structure and a second authentication dimension of a second deterministic structure of the plurality of deterministic structures;
computing the authentication imaging distance based on a relationship between the first authentication dimension and the registration dimensions; computing an expected imaging distance for the second deterministic structure based on a relationship between the authentication imaging distance and the registration dimensions;
computing an authentication normalization factor as a ratio between the first and second authentication dimensions;
computing an expected normalization factor for the second deterministic structure at the expected imaging distance based on the registration dimensions and the authentication imaging distance; and
authenticating the authentication object based on comparing the authentication normalization factor with the expected normalization factor; wherein: the authentication imaging distance is computed as a function of a focal characteristic of the imaging subsystem and a ratio between a first registration dimension and the first authentication dimension, the first registration dimension being one of the plurality of registration dimensions acquired by measuring the first deterministic structure during the prior registration process.

12. The system of claim 11, further comprising:
an output interface in communication with the control and processing module to outputting a user-perceivable authentication result responsive to and indicative of the control and processing module authenticating the authentication object.

13. The system of claim 11, further comprising:
an electronic access control system having registration database, the imaging subsystem, and the control and processing module integrated therein,
wherein the electronic access control system is configured to permit or deny access to a physical or electronic resource based on the authenticating.

14. The system of claim 11, wherein:
the plurality of registration dimensions comprises a first registration dimension acquired by measuring the first deterministic structure during the prior registration process; and
the first authentication dimension and the second authentication dimension are measured according to a unit dimension defined during the prior registration process based on the first registration dimension.

15. The system of claim 11, wherein:
the expected imaging distance is computed for the second deterministic structure by adding the authentication imaging distance to a registration imaging distance delta, the registration imaging distance delta being computed during the prior registration process to represent a difference between the respective imaging distances from the imaging subsystem to each of the first and second deterministic structures.

16. The system of claim 11, wherein:

the expected normalization factor for the second deterministic structure is computed as a function of a second registration dimension and a ratio between the authentication imaging distance and the expected imaging distance, the second registration dimension being one of the plurality of registration dimensions acquired by measuring the second deterministic structure during the prior registration process.

17. The system of claim 11, wherein:

the plurality of deterministic structures comprises the first deterministic structure, and a plurality of other deterministic structures that includes the second deterministic structure;

the processing the set of images comprises processing the set of images to measure the first authentication dimension for the first deterministic structure and a respective other authentication dimension for each of the plurality of other deterministic structures;

the obtaining registration dimensions comprises obtaining registration dimensions acquired by measuring the first deterministic structure and the plurality of other deterministic structures during the prior registration process;

the computing the expected imaging distance comprises computing a respective expected imaging distance for each of the plurality of other deterministic structures;

the computing the authentication normalization factor comprises computing a respective authentication normalization factor for each of the plurality of other deterministic structures;

the computing the expected normalization factor comprises computing a respective expected normalization factor for each of the plurality of other deterministic structures at the respective expected imaging distance; and the authenticating the authentication object is based on comparing a plurality of the respective authentication normalization factors with a corresponding plurality of the respective expected normalization factors.

18. The system of claim 17, wherein:

at least a first of the plurality of other deterministic structures of the authentication object is a macro-structure; and at least a second of the plurality of other deterministic structures of the authentication object is a micro-structure.

* * * * *